US009215340B2

(12) United States Patent
Nishiyama et al.

(10) Patent No.: US 9,215,340 B2
(45) Date of Patent: Dec. 15, 2015

(54) DISPLAY APPARATUS, DISPLAY METHOD, AND COMPUTER-READABLE RECORDING MEDIUM

(75) Inventors: Yoshihisa Nishiyama, Hino (JP); Masahiro Tomita, Hachioji (JP); Akifumi Kimura, Hachioji (JP); Satoshi Hara, Hino (JP)

(73) Assignee: Olympus Corporation, Tokyo (JP)

( * ) Notice: Subject to any disclaimer, the term of this patent is extended or adjusted under 35 U.S.C. 154(b) by 275 days.

(21) Appl. No.: 13/406,027

(22) Filed: Feb. 27, 2012

(65) Prior Publication Data

US 2012/0249583 A1    Oct. 4, 2012

(30) Foreign Application Priority Data

Mar. 31, 2011  (JP) .................................. 2011-080912

(51) Int. Cl.
*G09G 5/00*      (2006.01)
*H04N 1/00*      (2006.01)
*G01C 21/30*     (2006.01)
*H04N 5/77*      (2006.01)
*H04N 101/00*    (2006.01)

(52) U.S. Cl.
CPC ............ *H04N 1/00442* (2013.01); *G01C 21/30* (2013.01); *H04N 1/00129* (2013.01); *H04N 5/772* (2013.01); *H04N 2101/00* (2013.01); *H04N 2201/3253* (2013.01)

(58) Field of Classification Search
CPC .................. H04N 1/00442; H04N 2201/3253; G01C 21/30
See application file for complete search history.

(56) References Cited

U.S. PATENT DOCUMENTS

| 6,222,985 | B1* | 4/2001 | Miyake ......................... 386/224 |
| 8,085,169 | B2* | 12/2011 | Tsutsui ...................... 340/995.1 |
| 2004/0145663 | A1* | 7/2004 | Nishio et al. .................. 348/239 |
| 2009/0141966 | A1* | 6/2009 | Chen et al. .................... 382/154 |
| 2010/0017112 | A1* | 1/2010 | Sim .............................. 701/201 |

(Continued)

FOREIGN PATENT DOCUMENTS

| JP | 2001-042764 | 2/2001 |
| JP | 2005-085124 | 3/2005 |

(Continued)

OTHER PUBLICATIONS

Doug Adomatis, Make Your Own GPS Maps, Jul. 9, 2007, Internet Archive, downloaded from Internet Archive on Apr. 17, 2015, https://web.archive.org/web/20070501000000*/https://ott.web.cern.ch/ott/papers/MakeYourOwnGPSMaps.pdf, 9 pages.*

(Continued)

*Primary Examiner* — Jeffery A Brier
(74) *Attorney, Agent, or Firm* — John C. Pokotylo; Straub & Pokotylo

(57) ABSTRACT

A display apparatus includes a display unit that displays plural images corresponding to plural image data, respectively, the plural image data being associated with plural pieces of position information which are different from one another; a display position converter that converts the position information associated with each image into display position information that reflects a positional relationship relative to the position information of another image on a display screen of the display unit; and a display controller that causes the display unit to display the plural images based upon the display position information of each image converted by the display position converter.

19 Claims, 20 Drawing Sheets

(56) References Cited

U.S. PATENT DOCUMENTS

2010/0235096 A1* 9/2010 Miyagi ................ 701/209
2010/0321406 A1* 12/2010 Iwase et al. ............ 345/638

FOREIGN PATENT DOCUMENTS

| JP | 2010-068212 | 3/2010 |
| JP | 2010-117291 | 5/2010 |
| JP | 2011-043871 | 3/2011 |

OTHER PUBLICATIONS

Office Action to corresponding Japanese Patent Application Serial No. 2011-080912, mailed Dec. 24, 2014 (2 pgs.), with translation (4 pgs.).

* cited by examiner

DISPLAY APPARATUS, DISPLAY METHOD, AND COMPUTER-READABLE RECORDING MEDIUM

CROSS REFERENCE TO RELATED APPLICATIONS

This application is based upon and claims the benefit of priority from Japanese Patent Application No. 2011-080912, filed on Mar. 31, 2011, the entire contents of which are incorporated herein by reference.

BACKGROUND OF THE INVENTION

1. Field of the Invention

The present invention relates to a display apparatus and a display method that displays an image by using associated position information, when image data with which plural pieces of position information, which are different from one another, is associated is to be displayed.

2. Description of the Related Art

There has recently been known an imaging apparatus that displays an image corresponding to a template prepared beforehand onto a display monitor, synthesizes information such as a character onto the image corresponding to the template, and displays the resultant. For example, there has been known a technique in which information of position where an image is captured is associated with a captured image, and the captured image is automatically synthesized and displayed onto a map image according to the information of the position (see Japanese Laid-open Patent Publication No. 2010-68212).

In the conventional technique, the position information associated with the image data is used only in the case where the position information is displayed as being synthesized with a map image having position information beforehand, or in the case where the image data is managed. Therefore, a novel display technique that can allow a user to intuitively know the position information associated with the image data has been demanded.

SUMMARY OF THE INVENTION

A display apparatus according town aspect of the present invention includes: a display unit that displays a plurality of images corresponding to a plurality of image data, respectively, the plurality of image data being associated with plural pieces of position information which are different from one another; a display position converter that converts the position information associated with each image into display position information that reflects a positional relationship relative to the position information of another image on a display screen of the display unit; and a display controller that causes the display unit to display the plurality of images based upon the display position information of each image converted by the display position converter.

A display apparatus according to another aspect of the present invention includes: a display unit that displays a plurality of images corresponding to a plurality of image data, respectively, the plurality of image data being associated with plural pieces of position information which include longitudes and latitudes different from one another; a display position converter that converts the position information associated with each image into display position information that reflects a display position on a display screen of the display unit based upon the difference between the longitudes and the latitudes included in the position information associated with the images; and a display controller that determines the display position of the plurality of images, when they are displayed onto the display unit, based upon the display position information of each image converted by the display position converter.

A display apparatus according to still another aspect of the present invention includes: a display unit that displays a plurality of images corresponding to a plurality of image data, respectively, the plurality of image data being associated with plural pieces of position information which are different from one another; a touch panel that is provided on a display screen of the display unit, and that accepts an input of a signal according to an external touch position thereon; a position acquiring unit that acquires apparatus position information of the display apparatus; an association unit that associates the apparatus position information acquired by the position acquiring unit with the displayed image, when the touch panel accepts the input of the instruction signal on different positions on the display screen; and a display controller that causes the display unit to display the plurality of images based upon the apparatus position information associated with the displayed image by the association unit and the position information associated with each image.

A display method according to still another aspect of the present invention is executed by a display apparatus provided with a display unit that displays a plurality of images corresponding to a plurality of image data, respectively, the plurality of image data being associated with plural pieces of position information which are different from one another, and includes: converting the position information associated with each image into display position information that reflects positional relationship relative to the position information of another image on a display screen of the display unit; and causing the display unit to display the plurality of images based upon the display position information.

A computer-readable recording medium according to still another aspect of the present invention has an executable program stored thereon, and the program instructs a processor, which is provided to a display apparatus including a display unit that displays a plurality of images corresponding to a plurality of image data being associated with plural pieces of position information different from one another, to perform: converting the position information associated with each image into display position information that reflects positional relationship relative to the position information of another image on a display screen of the display unit; and causing the display unit to display the plurality of images based upon the display position information.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
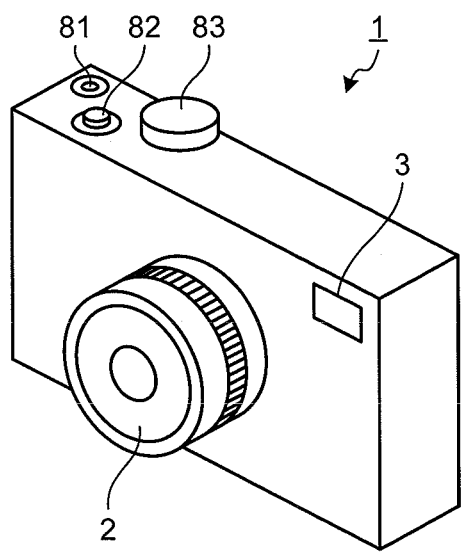
FIG. 1 is a view illustrating a structure of an imaging apparatus at the side facing a subject according to a first embodiment of the present invention.

Embodiments for embodying the present invention (hereinafter referred to as "embodiments") will be described below with reference to the drawings. The present invention is not limited by the embodiments described below. For example, aspects of different embodiments can be combined together. More specifically, aspects of the third and/or fourth embodiments can be combined with aspects of the second embodiment. In the description below, an imaging apparatus provided with a display apparatus is taken as an example. The same components are identified by the same numerals in the drawings.

First Embodiment

Figure 2:
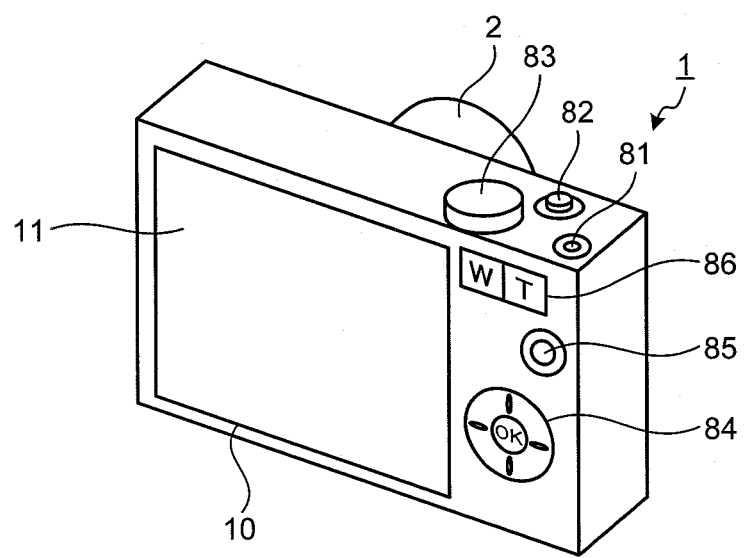
FIG. 2 is a view illustrating the structure of the imaging apparatus at the side facing a user according to the first embodiment of the present invention.
Figure 3:
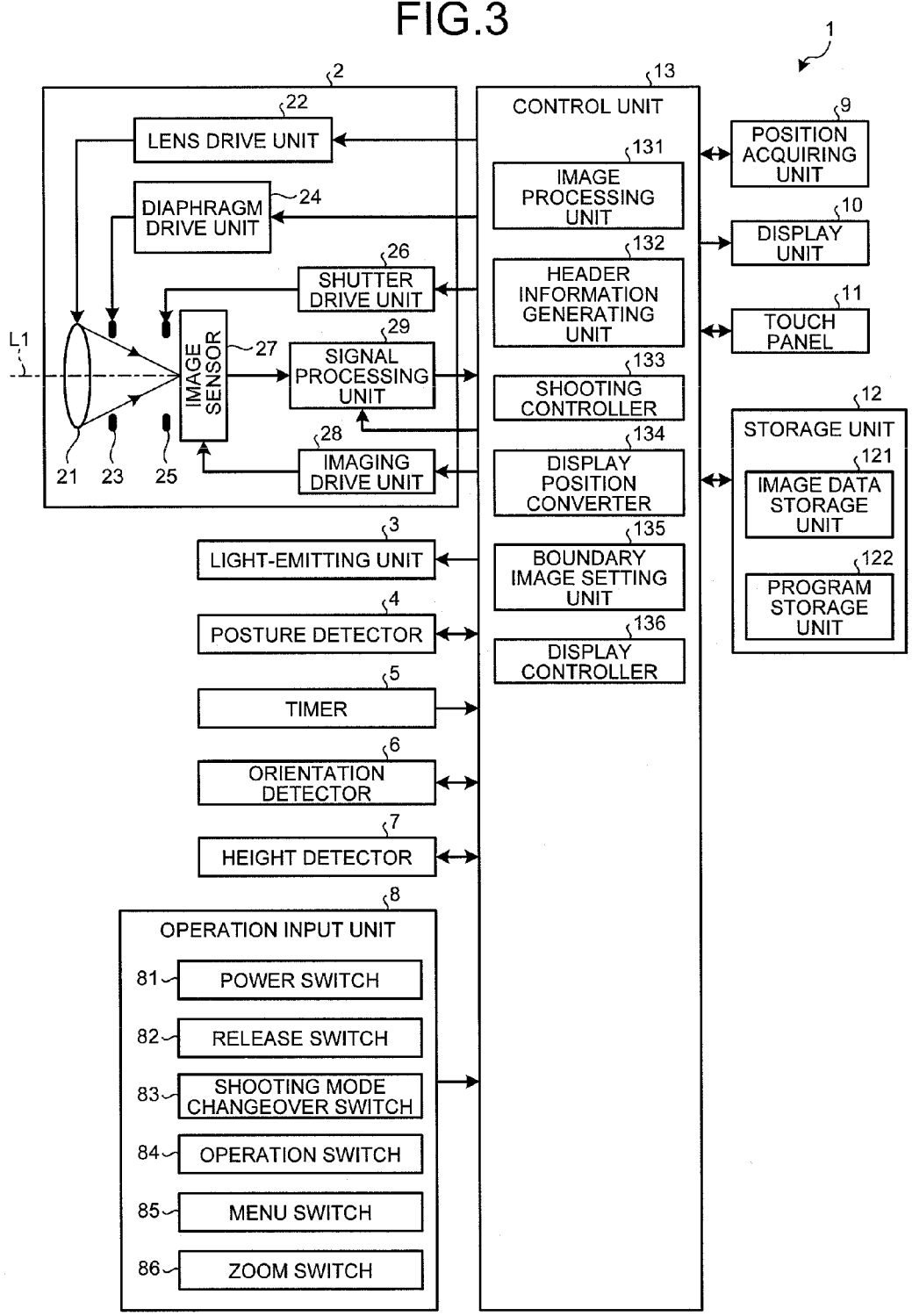
FIG. 3 is a block diagram illustrating the structure of the imaging apparatus according to the first embodiment of the present invention.

FIG. 1 is a view illustrating a structure of an imaging apparatus at the side (front surface) facing a subject according to a first embodiment of the present invention. FIG. 2 is a view illustrating the structure of the imaging apparatus at the side (back surface) facing a user according to the first embodiment of the present invention. FIG. 3 is a block diagram illustrating the structure of the imaging apparatus according to the first embodiment of the present invention.

As illustrated in FIGS. 1 to 3, an imaging apparatus 1 includes an imaging unit 2, a light-emitting unit 3, a posture detector 4, a timer 5, an orientation detector 6, a height detector 7, an operation input unit 8, a position acquiring unit 9, a display unit 10, a touch panel 11, a storage unit 12, and a control unit 13.

The imaging unit 2 images a predetermined area of field of view so as to generate image data. The imaging unit 2 includes a lens unit 21, a lens drive unit 22, a diaphragm 23, a diaphragm drive unit 24, a shutter 25, a shutter drive unit 26, an image sensor 27, an imaging drive unit 28, and a signal processing unit 29.

The lens unit 21 includes plural lens groups that can focus and zoom, and it condenses light from the predetermined area of field of view. The lens drive unit 22 is configured to include a stepping motor or a DC motor and moves the lens groups of the lens unit 21 along an optical axis L1, thereby changing a point of focus or focal distance of the lens unit 21.

The diaphragm 23 limits an amount of incident light condensed by the lens unit 21, thereby adjusting exposure. The diaphragm drive unit 24 includes a stepping motor to drive the diaphragm 23.

The shutter 25 sets the image sensor 27 to be in an exposure state or light-shielding state. The shutter drive unit 26 includes a stepping motor to drive the shutter 25 according to a release signal.

The image sensor 27 is composed of a CCD (Charge Coupled Device) or CMOS (Complementary Metal Oxide Semiconductor). The image sensor 27 receives the light condensed by the lens unit 21, and performs a photoelectric conversion, thereby converting the light into an electric signal (analog signal). The imaging drive unit 28 generates a timing pulse for driving the image sensor 27, and outputs the electric signal obtained through the photoelectric conversion by the image sensor 27 to the signal processing unit 29.

The signal processing unit 29 includes an analog amplifier and an A/D converter. The signal processing unit 29 makes a signal process, such as amplification (gain adjustment), to the electric signal outputted from the image sensor 27, and then, performs an A/D conversion for converting the electric signal into digital image data. Thereafter, the signal processing unit 29 outputs the digital image data to the control unit 13.

The light-emitting unit 3 is configured to use a xenon lamp or an LED (Light Emitting Diode). The light-emitting unit 3 irradiates strobe light, which is fill light, toward the area of the field of view imaged by the imaging apparatus 1.

The posture detector 4 is configured to use an acceleration sensor. The posture detector 4 detects the acceleration of the imaging apparatus 1 so as to detect the posture of the imaging apparatus 1. Specifically, the posture detector 4 detects the posture (tilt angle) of the imaging apparatus 1 with a horizontal surface being defined as a reference.

The timer 5 has a timer function and a determination function of shooting date and time. The timer 5 outputs date-time data to the control unit 13 in order to add the date-time data to the captured image data.

The orientation detector 6 is configured by a magnetic orientation sensor, and detects a reference orientation set beforehand in the imaging apparatus 1. Specifically, the orientation detector 6 detects components of earth magnetism in the vertical direction and in the horizontal direction when the display unit 10 is in the horizontal state, thereby detecting a reference orientation of the imaging apparatus 1, e.g., north.

The height detector 7 is configured by a semiconductor pressure sensor or an atmospheric pressure sensor, and it detects a change in atmospheric pressure so as to detect the height of the current position of the imaging apparatus 1.

The operation input unit 8 includes a power switch 81 that turns on or off the imaging apparatus 1, a release switch 82 that accepts an input of a release signal giving an instruction for capturing, a shooting mode changeover switch 83 that changes various shooting modes set to the imaging apparatus 1, an operation switch 84 that changes various settings of the imaging apparatus 1, a menu switch 85 that displays the various settings of the imaging apparatus 1 onto the display unit 10, and a zoom switch 86 that accepts an input of an instruction signal for changing an angle of view of the imaging apparatus 1.

The position acquiring unit 9 receives orbit information of a satellite sent from plural GPS (Global Positioning System) satellites forming a GPS, which is a measuring unit to measure a position of an object on the Earth's surface, and acquires apparatus position information of the imaging apparatus 1 based upon the received orbit information. The apparatus position information is longitude, latitude, and time information.

The display unit 10 is realized by using a display panel made of liquid crystal or organic EL (Electro Luminescence). The display unit 10 displays an image corresponding to the image data generated by the imaging unit 2. The display unit 10 appropriately displays the operation information of the imaging apparatus 1 and information involved with an image-capture.

The touch panel 11 is provided as overlaid on a display screen of the display unit 10 (see FIG. 2). The touch panel 11 detects a position where a user touches the touch panel based upon the information displayed onto the display unit 10, and accepts an input of an instruction signal according to the touch position. In general, there are a resistive touch panel, capacitance touch panel, and optical touch panel. Any of the touch panels may be applied in the first embodiment of the present invention. In the first embodiment, the touch panel 11 serves as an input unit.

The storage unit 12 is realized by using semiconductor memory, such as flash memory, and RAM (Random Access Memory), which can be fixedly mounted in the imaging apparatus 1. The storage unit 12 includes an image data storage unit 121 for storing image data captured by the imaging unit 2, and a program storage unit 122 for storing various programs and a display program executed by the imaging apparatus 1. The storage unit 12 may include a computer-readable recording medium such as a memory card externally inserted.

The control unit 13 is configured by using a CPU (Central Processing Unit). The control unit 13 issues instructions and transfers data corresponding to respective units constituting the imaging apparatus 1 according to the instruction signal or changeover signal from the operation input unit 8 or the touch panel 11, thereby entirely controlling the operation of the imaging apparatus 1.

The detailed configuration of the control unit 13 will be described. The control unit 13 includes an image processing unit 131, a header information generating unit 132, a shooting controller 133, a display position converter 134, a boundary image setting unit 135, and a display controller 136.

The image processing unit 131 executes various image processes to the image data inputted from the signal processing unit 29. Specifically, the image processing unit 131 executes an image process including at least a contour enhancement, a white balance, and gamma correction to the image data. The image processing unit 131 compresses or decompresses the image data based upon JPEG (Joint Photographic Experts Group) compression method or the like.

The header information generating unit 132 generates header information of the image data. Specifically, the header information generating unit 132 generates, as the header information of the image data, the date of the timer 5 when the release signal is inputted, the orientation detected by the orientation detector 6, the height detected by the height detector 7, and the apparatus information acquired by the position acquiring unit 9.

The shooting controller 133 makes a control of starting a capturing operation by the imaging apparatus 1, when the release signal is inputted. The capturing operation by the imaging apparatus 1 means that the signal processing unit 29 and the image processing unit 131 perform predetermined processes to the image data outputted by the image sensor 27 through the drive of the shutter drive unit 26 and the imaging drive unit 28. The image data to which the processes are performed as described above is associated with the header information generated by the header information generating unit 132, and stored in the image data storage unit 121 by the control unit 13.

The display position converter 134 converts the position information of the header information, associated with the respective images stored in the image data storage unit 121, into display position information that reflects the positional relationship relative to the position information of the header information associated with the other images on the display screen of the display unit 10.

The boundary image setting unit 135 sets, as a boundary image, an image having position information near the boundary of a region including all of position information associated with each of plural images. Specifically, the boundary image setting unit 135 sets the image with the maximum longitude or the maximum latitude, and the image with the minimum longitude or the minimum latitude, out of the plural images, as the boundary image, based upon the header information of each of plural image data. The boundary image setting unit 135 sets the image having the position information of the boundary of the region including all of the position information associated with each of plural images as the boundary image. The boundary image setting unit 135 may not include all position information associated with each of plural images. The boundary set by the boundary image setting unit 135 may not necessarily the region including all position information associated with each of plural images. Margins may be formed on the boundary.

The display controller 136 controls the display manner of the display unit 10. Specifically, the display controller 136 causes the display unit 10 to display plural images corresponding to each of plural image data stored in the image data storage unit 121, based upon the display position information of each image converted by the display position converter 134. The display controller 136 causes the display unit 10 to display each of two boundary images, set by the boundary image setting unit 135, on corners at different ends of the display screen. The display controller 136 also causes the display unit 10 to display reduced images (thumbnail images) formed by reducing each of plural images.

Figure 4:
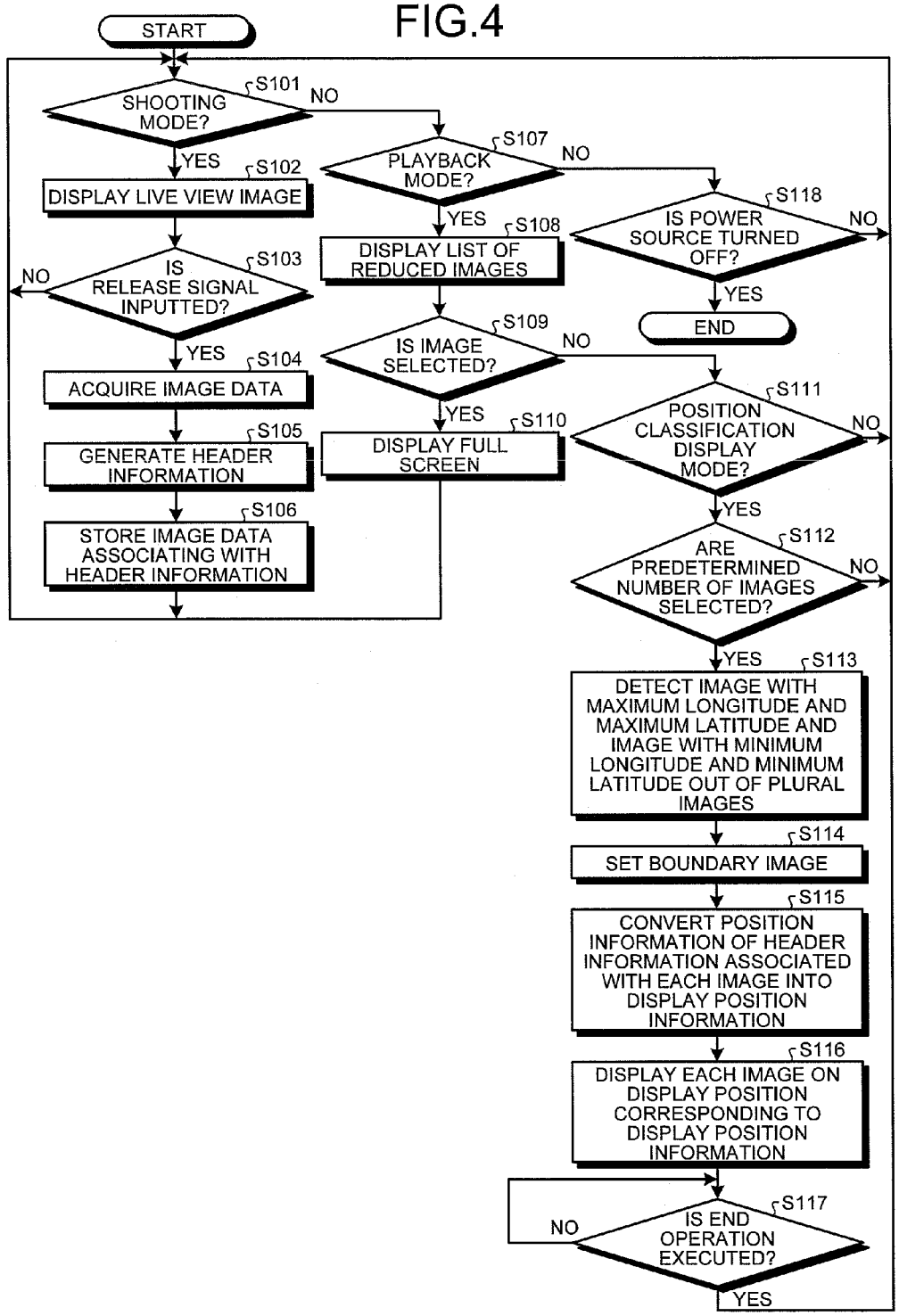
FIG. 4 is a flowchart illustrating an outline of a process executed by the imaging apparatus according to the first embodiment of the present invention.

The process executed by the imaging apparatus 1 thus configured will be described. FIG. 4 is a flowchart illustrating an outline of the process executed by the imaging apparatus 1.

In FIG. 4, the case where the imaging apparatus 1 is set to a shooting mode will be described (step S101: Yes). In this case, the display controller 136 causes the display unit 10 to display a live view image corresponding to the image data continuously generated by the imaging unit 2 at a small time interval (step S102).

Figure 5:
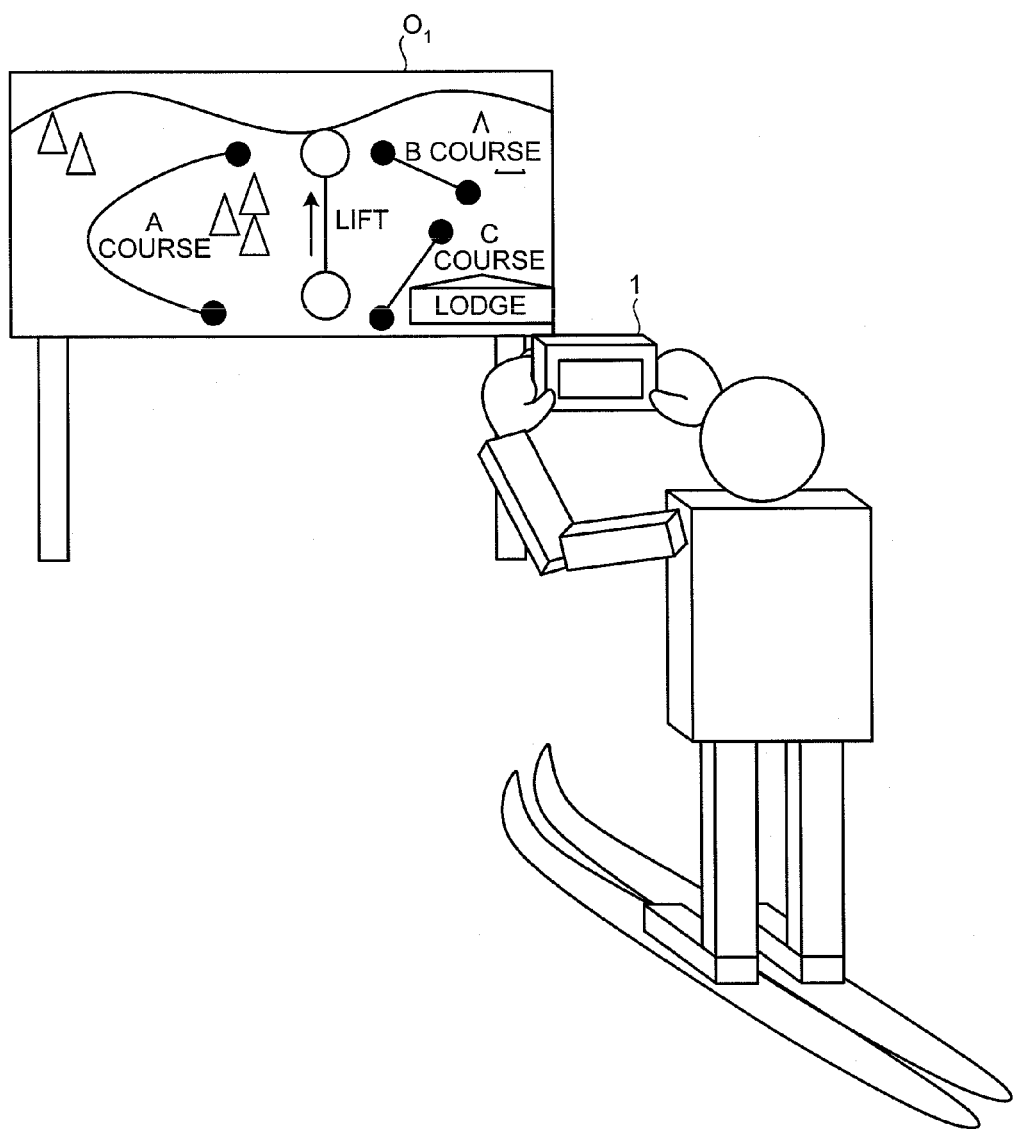
FIG. 5 is a view illustrating a condition during capturing an image with a shooting mode of the imaging apparatus according to the first embodiment of the present invention.
Figure 6:
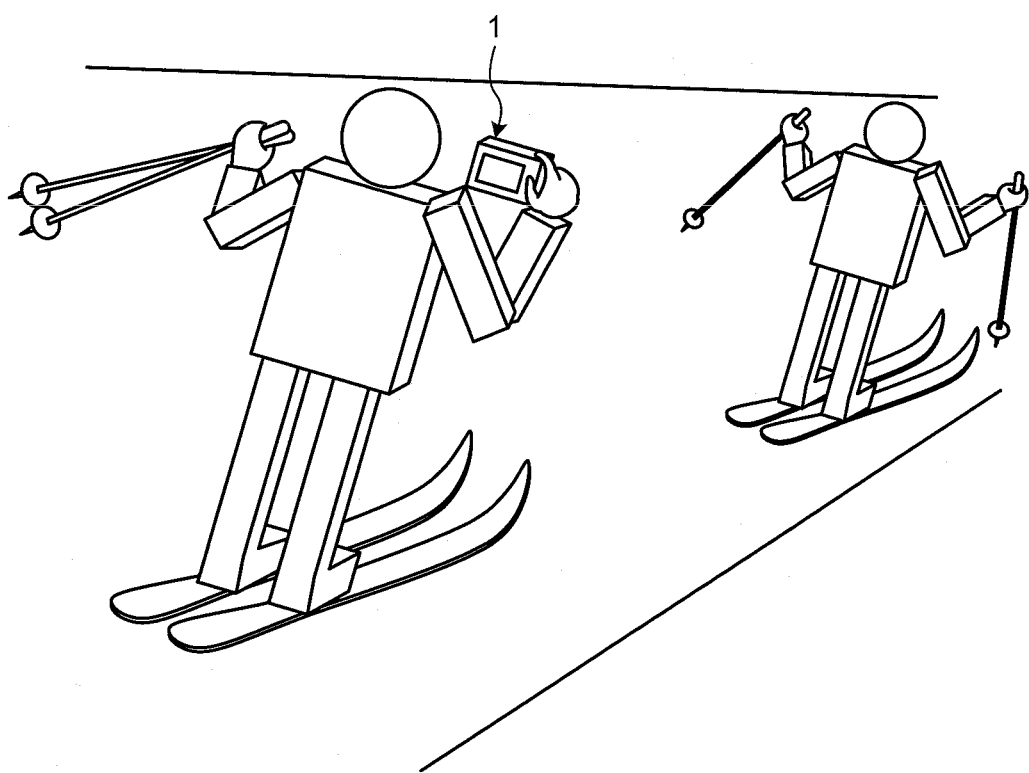
FIG. 6 is a view illustrating a condition during capturing an image with the shooting mode of the imaging apparatus according to the first embodiment of the present invention.
Figure 7:
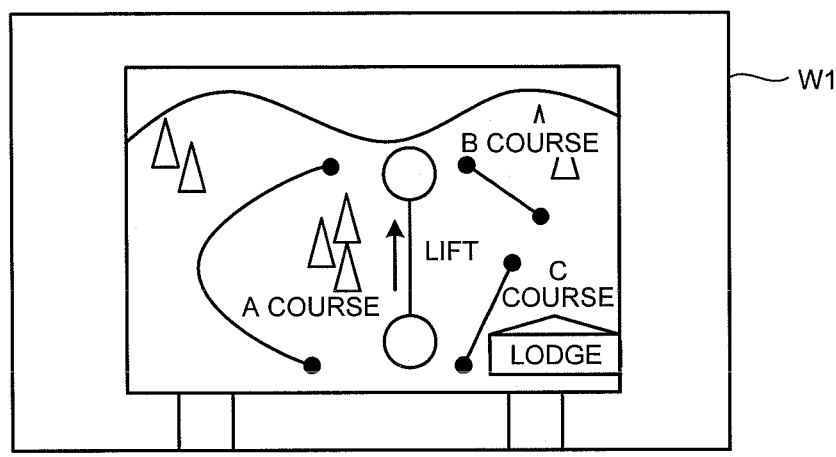
FIG. 7 is a view illustrating one example of an image displayed on a display unit when the imaging apparatus captures an image under the condition illustrated in FIG. 5.
Figure 8:
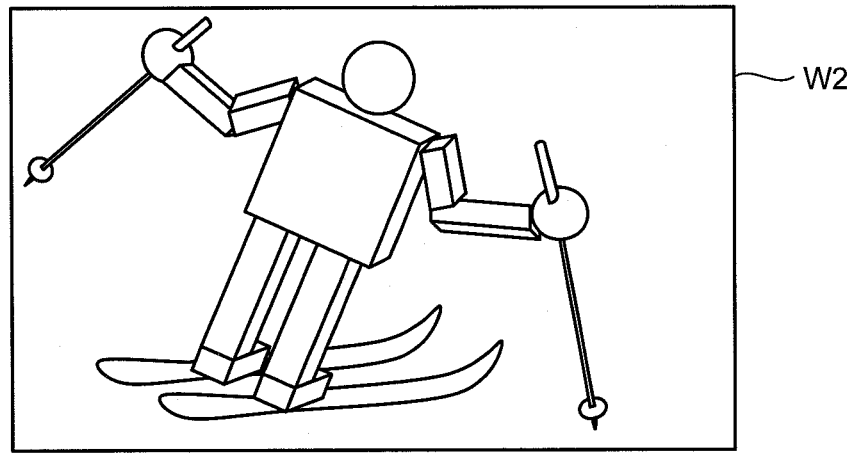
FIG. 8 is a view illustrating one example of an image displayed on a display unit when the imaging apparatus captures an image under the condition illustrated in FIG. 6.

FIGS. 5 and 6 are views illustrating conditions where a user captures an image with the shooting mode of the imaging apparatus 1. FIGS. 7 and 8 are views illustrating examples of an image displayed onto the display unit 10 when the user captures an image with the imaging apparatus 1 under the conditions illustrated in FIGS. 5 and 6. FIGS. 7 and 8 respectively illustrate one representative image W1 and one representative image W2 out of the live view images sequentially displayed on the display unit 10 in chronological order. As illustrated in FIGS. 5 to 8, the user determines a composition of capturing a subject (map signs O$_1$), while seeing the live view image such as the image W1 in FIG. 7.

In Step S103, when the release signal is inputted through the operation of the release switch 82 (step S103: Yes), the imaging apparatus 1 acquires image data under the control of the shooting controller 133 (step S104).

Then, the header information generating unit 132 generates header information that is to be added to the image data (step S105). Thereafter, the shooting controller 133 stores the image data into the image data storage unit 121 as allowing the header information to be associated with the image data (step S106), and then, the imaging apparatus 1 returns to step S101.

When the release signal is not inputted through the release switch 82 in step S103 (step S103: No), the imaging apparatus 1 returns to step S101.

Next, the case where the imaging apparatus 1 is not set to the shooting mode in step S101 (step S101: No) will be described. In this case, when the imaging apparatus 1 is set to a playback mode (step S107: Yes), the display controller 136 causes the display unit 10 to display a list of reduced images (thumbnail images) formed by reducing the images corresponding to the image data stored in the image data storage unit 121 (step S108).

Then, when the reduced image, which is to be displayed as enlarged, is selected through the operation input unit 8 or the touch panel 11 (step S109: Yes), the display controller 136 causes the display unit 10 to display the selected reduced image in a predetermined time (e.g., 3 seconds) as enlarging to full screen (step S110), and then, the imaging apparatus 1 moves to step S101.

On the other hand, when the reduced image, which is to be displayed as enlarged, is not selected through the operation input unit 8 or the touch panel 11 (step S109: No), the control unit 13 determines whether a position classification display mode is selected or not based upon the header information of the image data via the operation input unit 8 or the touch panel 11 (step S111), wherein the position classification display mode is to relatively display the relationship of the display positions of the respective images on the display screen of the display unit 10. For example, the control unit 13 determines whether or not an icon (not illustrated) of the position classification display mode is selected according to the instruction signal inputted from the touch panel 11, when the user selects the icon involved with the position classification display mode in the display screen displayed on the display unit 10 through the touch panel 11. When the position classification display mode is selected (step S111: Yes), the imaging apparatus 1 moves to later-described step S112. On the other hand, when the position classification display mode is not selected within a predetermined time (e.g., 3 seconds) (step S111: No), the imaging apparatus 1 returns to step S101.

In step S112, the control unit 13 determines whether or not a predetermined number of images, to which the position classification display is performed, in the list of the reduced images displayed on the display unit 10 are selected. Specifically, the control unit 13 determines whether or not the predetermined number (e.g., the predetermined number is 2 or more) of images to which the position classification display is performed is selected by the user according to the instruction signal inputted from the touch panel 11. When the images in the predetermined number are selected from the list of the reduced images displayed on the display unit 10 (step S112: Yes), the imaging apparatus 1 moves to later-described step S113. On the other hand, when the images in the predetermined number are not selected within the predetermined time (e.g., 5 seconds) (step S112: No), the imaging apparatus 1 returns to step S101.

In step S113, the boundary image setting unit 135 detects an image with the maximum longitude and the maximum latitude, and an image with the minimum longitude and the minimum latitude, out of the selected plural images, based upon the header information of each of the selected image data. The boundary image setting unit 135 may detect an image with either one of the maximum longitude and the maximum latitude, and an image with either one of the minimum longitude and the minimum latitude, out of the selected plural images.

Figure 9:
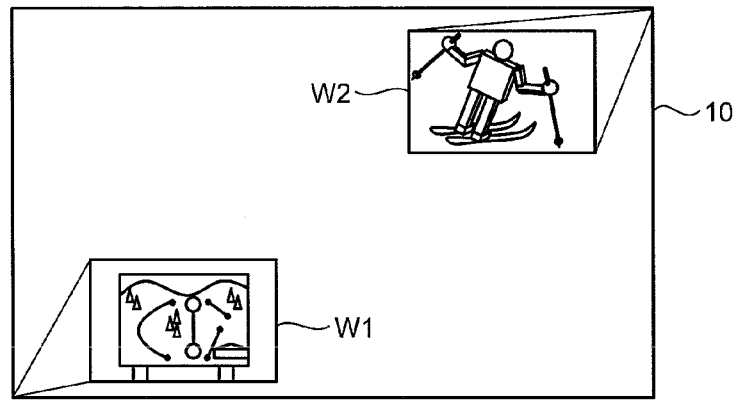
FIG. 9 is a view illustrating one example of an image displayed on the display unit of the imaging apparatus according to the first embodiment of the present invention.

Next, the boundary image setting unit 135 sets the image with the maximum longitude and the maximum latitude, and the image with the minimum longitude and the minimum latitude, as the boundary image having the position information of the boundary of the region including all header information of the respective plural image data (step S114). For example, as illustrated in FIG. 9, the boundary image setting unit 135 sets the display position of the image W1 with the minimum longitude and the minimum latitude on the lower left corner on the display screen of the display unit 10, while setting the display position of the image W2 with the maximum longitude and the maximum latitude on the upper right corner on the display screen of the display unit 10.

Thereafter, the display position converter 134 converts the position information of the header information of each of the selected plural image data into the display information that indicates the relative display position on the display screen of the display unit 10, based upon the header information associated with two boundary images set by the boundary image setting unit 135 (step S115).

Figure 10:
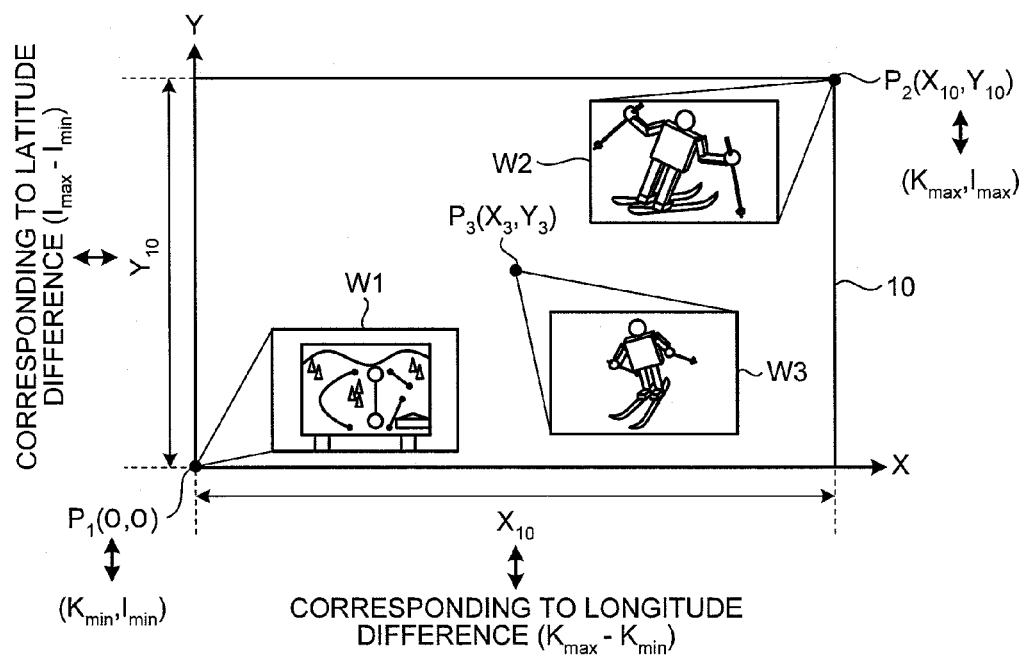
FIG. 10 is a view describing an outline of a conversion method by a display position converter of the imaging apparatus according to the first embodiment of the present invention.

FIG. 10 is a view describing an outline of a conversion method by the display position converter 134. In FIG. 10, the lower left point of the display screen of the display unit 10 is defined as an origin, the lateral direction of the display unit 10 is defined as an X axis, and the longitudinal direction thereof is defined as a Y axis. In FIG. 10, the abscissa axis corresponds to the longitude, while the ordinate axis corresponds to the latitude.

As illustrated in FIG. 10, the display position converter 134 converts the position information of an image W3 into the display position information according to an equation below, when the coordinate $P_1$ of the boundary image W1 having the minimum values $(K_{min}, I_{min})$ of the longitude (K) and the latitude (I) is defined as (0, 0), the coordinate $P_2$ of the boundary image W2 having the maximum values $(K_{max}, I_{max})$ of the longitude and the latitude is defined as $(X_{10}, Y_{10})$, and the coordinate of the image W3 having the longitude $K_3$ and the latitude $I_3$ as the position information is defined as $(X_3, Y_3)$.

$$X_{10}:X_3=(K_{max}-K_{min}):(K_3-K_{min}) \quad (1)$$

Accordingly, $$X_3=X_{10}\times(K_3-K_{min})/(K_{max}-K_{min}) \quad (2)$$

Similarly, $$Y_3=Y_{10}\times(I_3-I_{min})/(I_{max}-I_{min}) \quad (3)$$

As described above, the display position converter 134 converts the position information of the header information of each of the selected plural image data into the display position information, which reflects the relative positional relationship with the position information of other images on the display screen of the display unit 10, by using the equations (2) and (3).

Next, the display controller 136 causes the display unit 10 to display each of the selected plural images based upon the display position information converted by the display position converter 134 (step S116). For example, as illustrated in FIG. 10, the display controller 136 causes the display unit 10 to display each of the selected plural images so as to have a positional relationship relative to other images. With this process, the user can intuitively grasp the shooting position where the user captures each image. FIG. 10 illustrates that only one image is displayed with the positional relationship relative to the other images on the display screen of the display unit 10, in order to simplify the description. However, if there are plural images, they are similarly displayed.

When an operation of ending the position classification display mode is executed (step S117: Yes), the imaging apparatus 1 returns to step S101. On the other hand, when the operation of ending the position classification display mode is not executed (step S117: No), the imaging apparatus 1 continues this determination.

Next, the case where the imaging apparatus 1 is not set to the shooting mode and the playback mode (step S101: No, step S107: No) will be described. In this case, when the power source of the imaging apparatus 1 is turned off (step S118: Yes) through the operation on the power switch 81, the imaging apparatus 1 ends a series of processes. On the other hand, when the power source of the imaging apparatus 1 is not turned off (step S118: No), the imaging apparatus 1 returns to step S101.

According to the first embodiment of the present invention described above, the display position converter 134 converts the position information associated with the respective images into the display position information that reflects the positional relationship relative to the position information of the other images on the display screen of the display unit 10, and the display controller 136 causes the display unit 10 to display plural images based upon the display position information of each image converted by the display position converter 134. Thus, the user can promptly, easily, and intuitively grasp the positional shooting relationship of each image from the shooting places of the captured images, when the respective images are displayed onto the display unit 10 all together.

According to the first embodiment of the present invention, the user can promptly, easily, and intuitively grasp the positional relationship of each image without a need to record dedicated map information, and to search and read out the dedicated map information and to adjust the scale.

The first embodiment of the present invention describes the case where the imaging apparatus can display which place of a ski resort the image is captured in a plain way. However, if a user captures images during a tour of Tokyo, a classification display of whether the shooting place is uptown or old town is possible. As a result, the user can promptly confirm which place the image is captured, and the user can confirm an area (place) where an image has not yet been captured as the user sees the classification of images displayed onto the display unit 10, even during the image-capture.

Second Embodiment

A second embodiment of the present invention will next be described. An imaging apparatus according to the second embodiment of the present invention has the configuration the same as that of the imaging apparatus according to the first embodiment, and the configuration of the control unit and the operation process by the imaging apparatus are different. Therefore, in the description below, the configuration different from the above-mentioned first embodiment will firstly be described, and then, the operation process of the imaging apparatus according to the second embodiment will be described. The second embodiment of the present invention aims to cause the image display on a map, which is likely to be ordinary-looking, to have high originality, as the map is effectively utilized.

Figure 11:
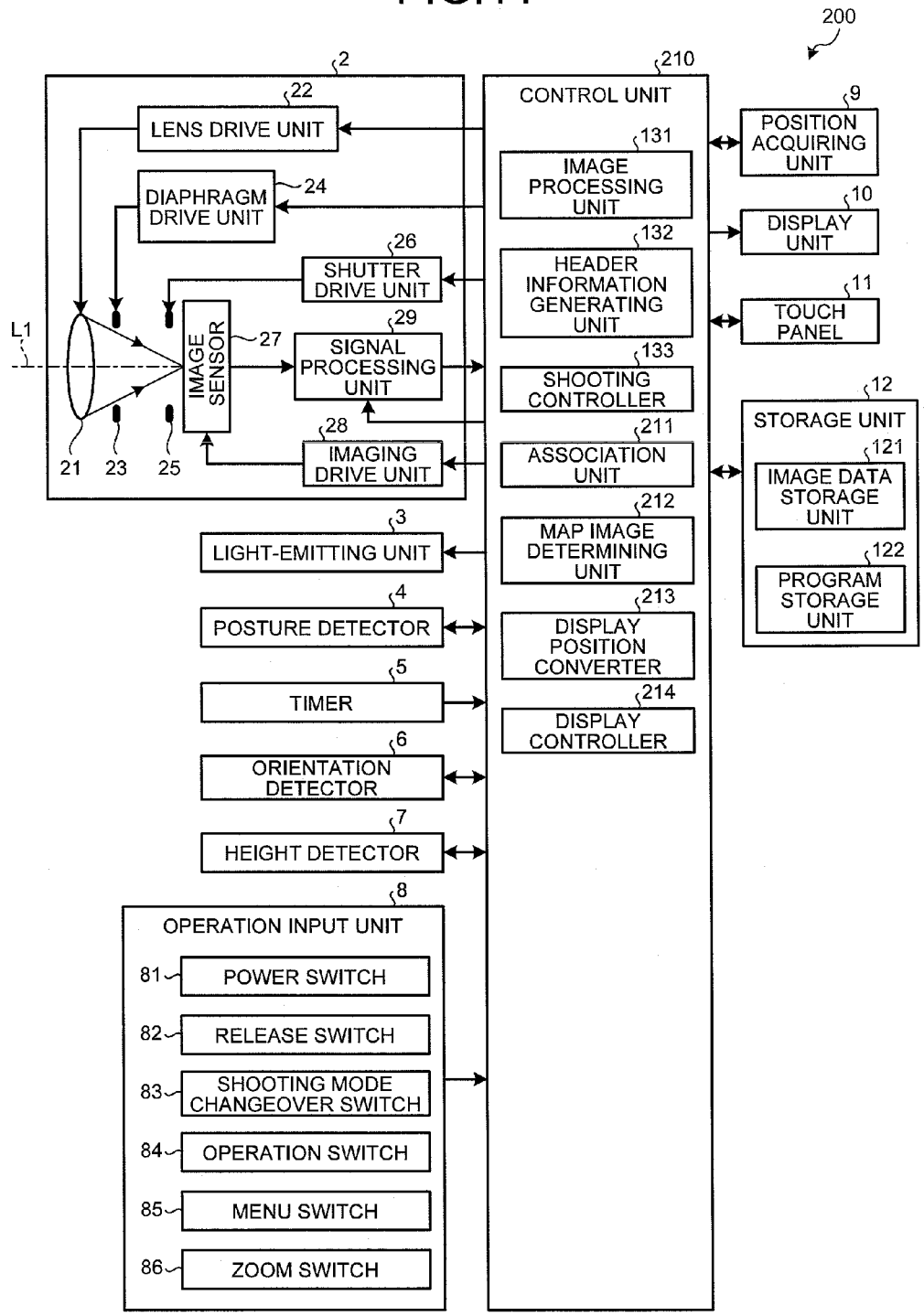
FIG. 11 is a block diagram illustrating a structure of an imaging apparatus according to a second embodiment of the present invention.

FIG. 11 is a block diagram illustrating a structure of an imaging apparatus 200 according to the second embodiment of the present invention. As illustrated in FIG. 11, the imaging apparatus 200 includes a control unit 210.

The control unit 210 includes an image processing unit 131, a header information generating unit 132, a shooting controller 133, an association unit 211, a map image determining unit 212, a display position converter 213, and a display controller 214.

When a signal is inputted from the touch panel 11, the association unit 211 associates the apparatus position information acquired by the position acquiring unit 9 with the position according to the instruction signal inputted from the touch panel 11 in the displayed image displayed on the display unit 10. The association unit 211 associates the apparatus position information acquired at different times by the position acquiring unit 9 with different positions in the displayed image displayed onto the display unit 10. The apparatus position information is written as the position information (longitude and latitude) of the header information associated with the image data.

The map image determining unit 212 determines whether the image, which corresponds to the image data generated by the imaging unit 2, is a map image or not. For example, the map image determining unit 212 detects a map symbol, an orientation symbol, a character, or a scale symbol in an image corresponding to the image data generated by the imaging unit 2, by use of a known technique such as an OCR (Optical Character Reader) or pattern matching, and determines whether the image is a map image or not according to the result of the detection. The map image determining unit 212 determines the direction of the reference orientation of the map image, when the display unit 10 displays the map image. For example, the map image determining unit 212 detects the orientation symbol of the map image with the pattern matching, and determines the direction pointed by the north of the detected orientation symbol on the map image.

The display position converter 213 converts the position information of the header information of each of plural image data into the display position information, which reflects the relative positional relationship with the position information of other images on the display screen of the display unit 10, based upon the apparatus position information associated with each of the different positions on the displayed image, displayed onto the display unit 10, by the association unit 211.

The display controller 214 causes the display unit 10 to display plural images corresponding to each of plural image data stored in the image data storage unit 121, based upon the display position information of each image converted by the display position converter 213.

Figure 12:
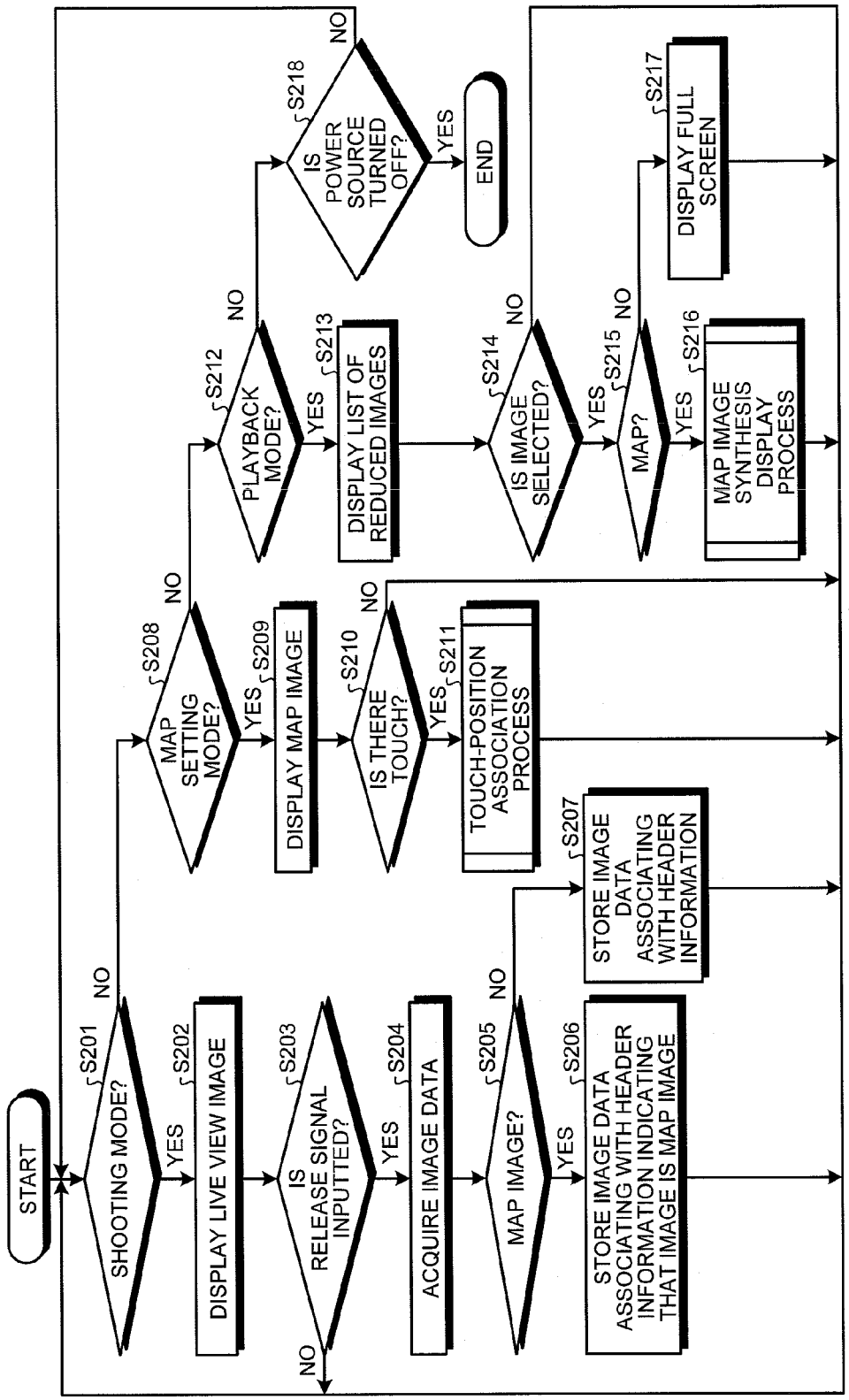
FIG. 12 is a flowchart illustrating an outline of a process executed by the imaging apparatus according to the second embodiment of the present invention.

The process executed by the imaging apparatus 200 thus configured will be described. FIG. 12 is a flowchart illustrating an outline of the process executed by the imaging apparatus 200.

In FIG. 12, the case where the imaging apparatus 200 is set to a shooting mode will be described (step S201: Yes). In this case, the display controller 214 causes the display unit 10 to display a live view image corresponding to the image data continuously generated by the imaging unit 2 at a small time interval (step S202).

When the release signal is inputted through the operation of the release switch 82 (step S203: Yes), the imaging apparatus 200 acquires image data under the control of the shooting controller 133 (step S204), and proceeds to step S205. On the other hand, when the release signal is not inputted through the release switch 82 (step S203: No), the imaging apparatus 200 returns to step S201.

In step S205, the map image determining unit 212 determines whether the image corresponding to the acquired image data is a map image or not. When the image corresponding to the acquired image data is a map image (step S205: Yes), the imaging apparatus 200 writes information, indicating that the image is a map image, on the header information generated by the header information generating unit 132, and stores the header information into the image data storage unit 121 as associating the same with the acquired image data (step S206). Then, the imaging apparatus 200 returns to step S201.

On the other hand, the image corresponding to the acquired image data is not a map image (step S205: No), the imaging apparatus 200 associates the header information, generated by the header information generating unit 132, with the acquired image data, and stores the resultant to the image data storage unit 121 (step S207). Then, the imaging apparatus 200 returns to step S201.

Next, the case where the imaging apparatus 200 is not set to the shooting mode (step S201: No) in step S201 will be described. In this case, when the imaging apparatus 200 is set to a map setting mode (step S208: Yes), the display controller 214 displays the map image onto the display unit 10 by referring to the header information of the image data stored in the image data storage unit 121 (step S209). In this case, the display controller 214 may superimpose a display of urging a user to touch, or a display such as a graphic and icon on the map image displayed onto the display unit 10. Further, the control unit 13 may output, for example, a vocal guidance urging the user to touch by unillustrated speakers.

Then, the control unit 210 determines whether the map image displayed onto the display unit 10 is touched or not through the touch panel 11 (step S210). Specifically, the control unit 210 determines whether or not an instruction signal according to an external touch position is inputted from the touch panel 11. When the map image displayed onto the display unit 10 is touched (step S210: Yes), the imaging apparatus 200 executes a touch-position association process in which the position information acquired by the position acquiring unit 9 is associated with the touched position (step S211), and then, returns to step S201. The detail of the touch-position association process will be described later.

On the other hand, when the map image displayed onto the display unit 10 is not touched within a predetermined time (e.g., within 3 seconds) (step S210: No), the imaging apparatus 200 returns to step S201.

Next, the case where the imaging apparatus 200 is not set to the shooting mode or the map setting mode (step S201; No, step S208; No), but set to the playback mode (step S212: Yes) will be described. In this case, the display controller 214 causes the display unit 10 to display a list of reduced images formed by reducing the images corresponding to the image data stored in the image data storage unit 121 (step S213).

Subsequently, when the reduced image, which is to be displayed as enlarged, is selected through the operation input unit 8 or the touch panel 11 (step S214: Yes), and the selected image is the map image (step S215: Yes), the imaging apparatus 200 executes a map image synthesis display process based upon the position information of the header information of each of plural image data stored in the image data storage unit 121 (step S216), and then, returns to step S201. The map image synthesis display process is to synthesize each image with the map image so as to be displayed in the relationship of relative display positions with each image on the display screen of the display unit 10. The detail of the map image synthesis display process will be described.

On the other hand, when the selected image is not the map image (step S215: No), the display controller 214 displays the selected reduced image within a predetermined time (e.g., 3 seconds) on the display unit 10 as enlarging to full screen (step S217), and then, the imaging apparatus 200 returns to step S201.

The case where the reduced image, which is to be displayed as enlarged within the predetermined time (3 seconds), is not selected through the operation input unit 8 or the touch panel 11 in step S214 (step S214: No) will be described. In this case, the imaging apparatus 200 returns to step S201.

Next, the case where the imaging apparatus 200 is set to none of the shooting mode, the map setting mode, and the playback mode (step S201: No, step S208: No, step S212: No) will be described. In this case, when the power source of the imaging apparatus 200 is turned off (step S218: Yes) through the operation on the power switch 81, the imaging apparatus 200 ends a series of processes. On the other hand, when the power source of the imaging apparatus 200 is not turned off (step S218: No), the imaging apparatus 200 returns to step S201.

Figure 13:
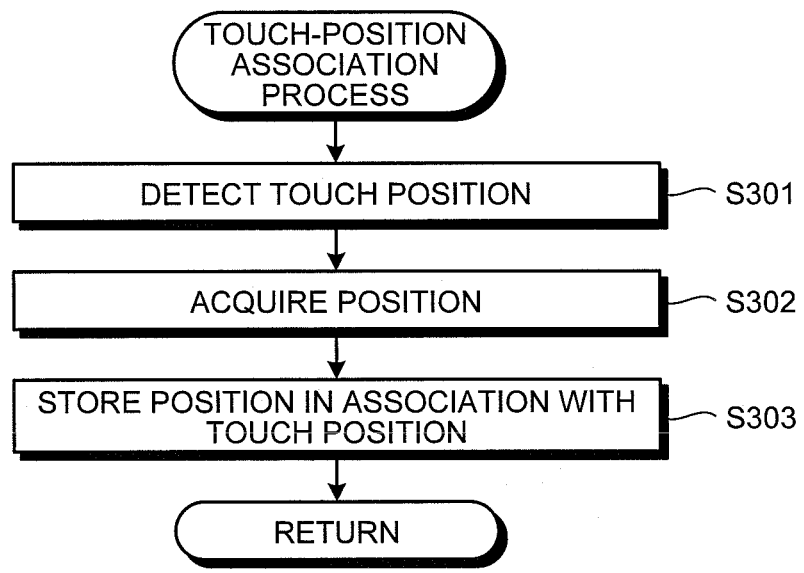
FIG. 13 is a flowchart illustrating the outline of a touch-position association process illustrated in FIG. 12.

The touch-position association process in step S211 illustrated in FIG. 12 will next be described. FIG. 13 is a flowchart illustrating the outline of the touch-position association process illustrated in FIG. 12.

As illustrated in FIG. 13, the association unit 211 detects the touch position (touch region) where the user touches on the map image displayed on the display unit 10 according to the instruction signal inputted from the touch panel 11 (step S301).

Next, the position acquiring unit 9 acquires the apparatus position of the imaging apparatus 200 (step S302). Thereafter, the association unit 211 associates the apparatus position information acquired by the position acquiring unit 9 with the detected touch position, and causes the resultant to store in the image data storage unit 121 (step S303), and then, the imaging apparatus 200 returns to the main routine illustrated in FIG. 12.

Figure 14:
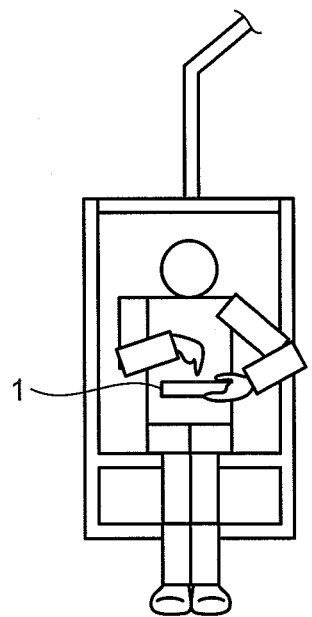
FIG. 14 is a view for schematically describing the condition when a user touches a map image displayed onto the display unit of the imaging apparatus according to the second embodiment of the present invention at a position.
Figure 15:
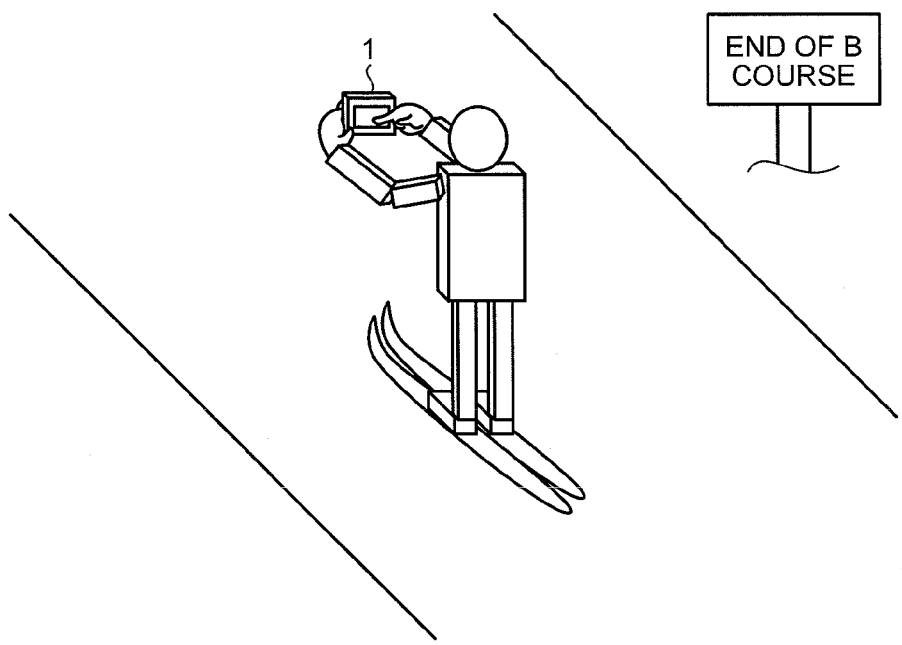
FIG. 15 is a view schematically describing another condition when a user touches a map image displayed onto the display unit of the imaging apparatus according to the second embodiment of the present invention at a different position.
Figure 16:
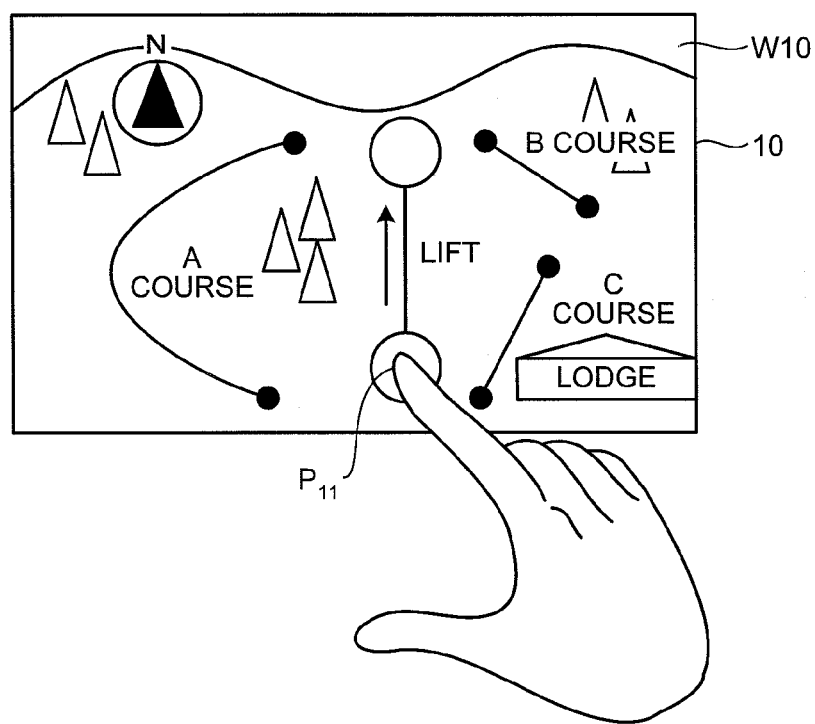
FIG. 16 is a view schematically describing a touch operation of a user who touches the map image displayed onto the display unit under the condition illustrated in FIG. 14.
Figure 17:
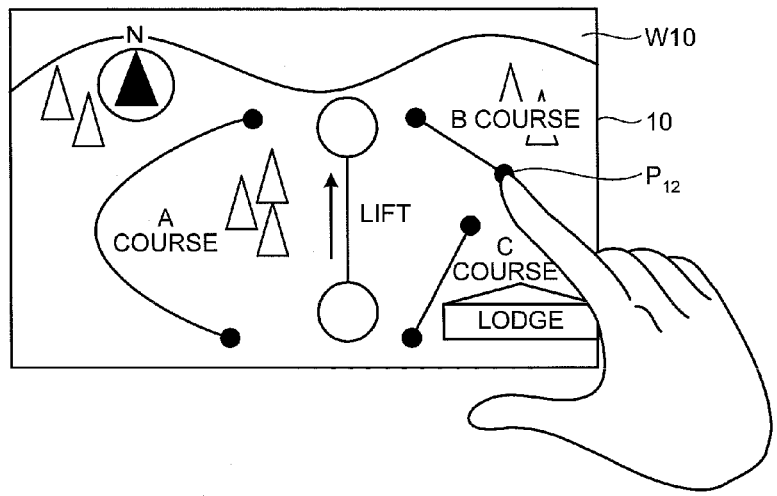
FIG. 17 is a view schematically describing a touch operation of a user who touches the map image displayed onto the display unit under the condition illustrated in FIG. 15.

FIGS. 14 and 15 are views schematically illustrating conditions when the user touches the map image displayed onto the display unit 10 at different positions. FIGS. 16 and 17 are views schematically illustrating the touch operation that the user touches the map image displayed onto the display unit 10 under the conditions illustrated in FIGS. 14 and 15.

As illustrated in FIGS. 14 to 17, the user touches the position corresponding to the current position on the map image W10 displayed on the display unit 10 through the touch panel 11. For example, in the case of FIG. 14, the user touches a point $P_{11}$ corresponding to a start point of a lift gate on the image W10 in FIG. 16, immediately after riding the lift on the lift gate. In the case of FIG. 15, the user touches a point $P_{12}$ corresponding to an end point of a B course on the image W10 illustrated in FIG. 17, immediately after skiing on the B course. In this case, the association unit 211 detects the touch positions (point $P_{11}$, point $P_{12}$) where the user touches, according to the instruction signal inputted from the touch panel 11, associates the apparatus position information acquired by the position acquiring unit 9 with the detected touch positions, and stores the resultant into the image data storage unit 121.

In this manner, the association unit 211 can generate the map image W10 having the position information (longitude and latitude), because the user touches the different positions on the touch panel 11 (see FIGS. 16 and 17). The association unit 211 can generate the map image, when at least only two positions on the map image W10 are touched.

Figure 18:
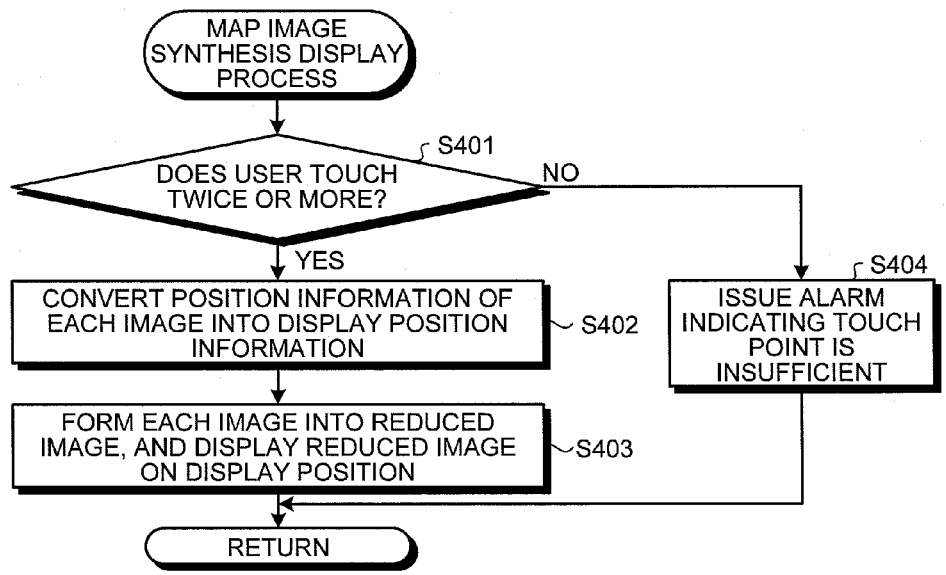
FIG. 18 is a flowchart illustrating the outline of a map image synthesis display process illustrated in FIG. 12.

The map image synthesis display process in step S216 in FIG. 12 will next be described. FIG. 18 is a flowchart illustrating the outline of the map image synthesis display process illustrated in FIG. 12.

As illustrated in FIG. 18, the control unit 210 determines whether or not the user touches twice or more the map image displayed onto the display unit 10 at different positions (step S401). Specifically, the control unit 210 determines whether or not the apparatus position information, acquired for the different positions on the map image W10 at different times by the association unit 211, is written on the header information associated with the map image W10 displayed onto the display unit 10 as the position information. When the user touches twice or more at different positions (step S401: Yes), the imaging apparatus 200 proceeds to later-described step S402. On the other hand, when the user does not touch twice or more at different positions (step S401: No), the imaging apparatus 200 proceeds to later-described step S404.

In step S402, the display position converter 213 converts the position information of the header information of each of plural image data into the display position indicating the relationship of the relative display position of each image on the display screen on the display unit 10, based upon the position information that is associated with the different positions on the map image W10 by the association unit 211 and that is acquired at different times.

Figure 19:
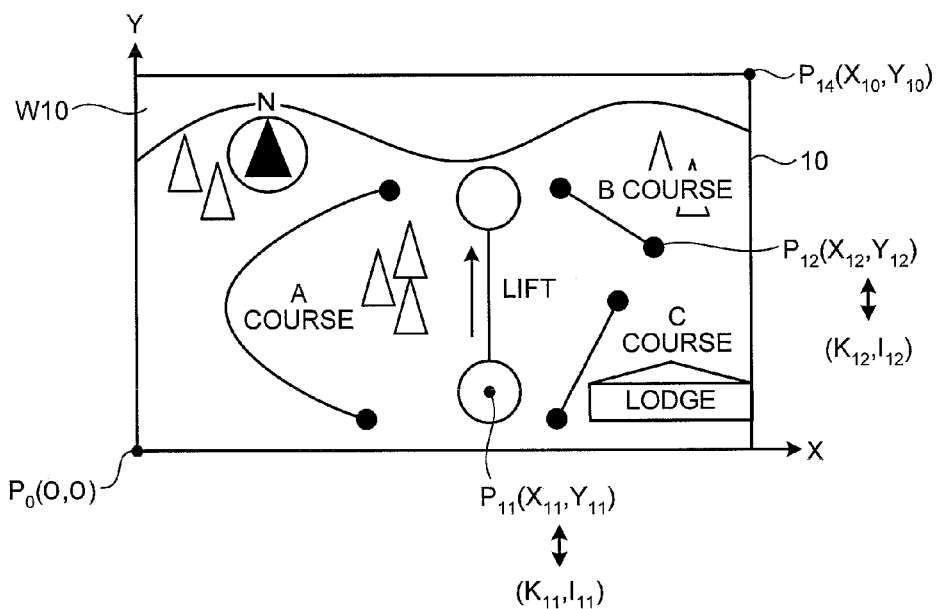
FIG. 19 is a view describing an outline of a conversion method by a display position converter of the imaging apparatus according to the second embodiment of the present invention.
Figure 20:
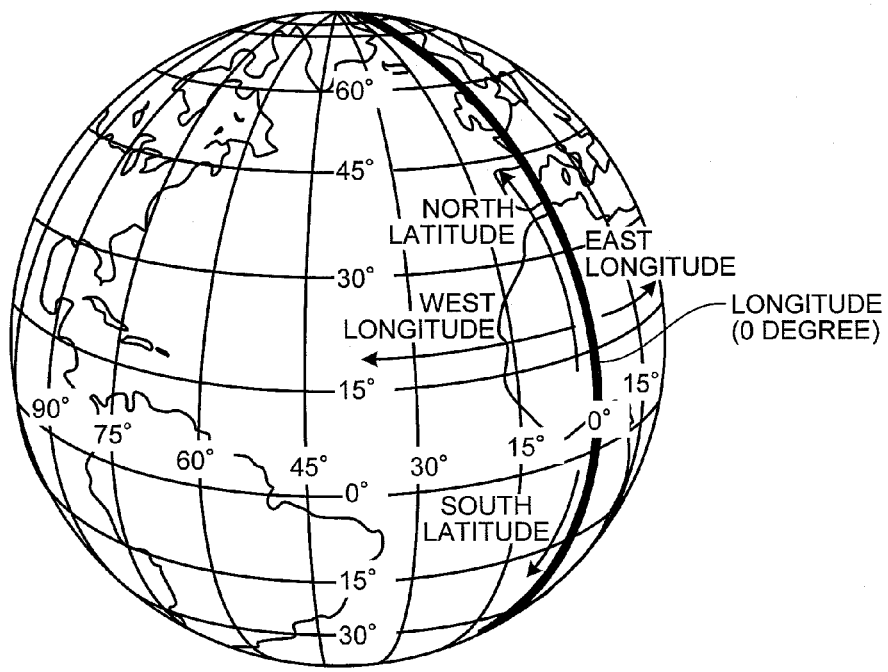
FIG. 20 is a view supplementing the outline of the conversion method by the display position converter of the imaging apparatus according to the second embodiment of the present invention.

FIG. 19 is a view describing an outline of the conversion process by the display position converter 213. FIG. 20 is a view supplementing the outline of the conversion process by the display position converter 213. FIG. 19 illustrates the case where the upper part of the map image W10 points north. In order to simplify the description for FIG. 19, the position information acquired by the position acquiring unit 9 is supposed to be acquired in the region on the Eastern Hemisphere and the Northern Hemisphere. When the position $P_{14}$ on the upper right corner is defined as the maximum value $(X_{10}, Y_{10})$ of the X axis and Y axis in a coordinate system on the display screen on the display unit 10 wherein the position $P_0$ at the lower left corner is defined as (0, 0), the lateral direction of the map image W10 is defined as the X axis, and the longitudinal direction is defined as the Y axis, the magnitude relation of east longitude and north latitude agrees with the magnitude relation on the coordinate system (see FIG. 20).

As illustrated in FIG. 19, when the longitude and latitude of the touch position $P_{11}$ $(X_{11}, Y_{11})$ is $(K_{11}, I_{11})$, the longitude and latitude of the touch position $P_{12}$ $(X_{12}, Y_{12})$ is $(K_{12}, I_{12})$, the longitude and the latitude of the image W2 (see FIG. 8) to be synthesized is $(K_{13}, I_{13})$, and the display position of the image W2 to be synthesized on the display screen of the display unit 10 is a point $P_{13}$ $(X_{13}, Y_{13})$, on the coordinate system on the display screen of the display unit 10, the display position converter 213 converts the position information of the image W2 into the display position information according to the approximate equations described below.

$$(X_{13}-X_{11}):(X_{12}-X_{11})=(K_{13}-K_{11}):(K_{12}-K_{11}) \quad (4)$$

Accordingly, $$X_{13}=X_{11}+(K_{13}-K_{11})\times(X_{12}-X_{11})/(K_{12}-K_{11}) \quad (5)$$

Similarly, $$Y_{13}=Y_{11}+(I_{13}-I_{11})\times(Y_{12}-Y_{11})/(I_{12}-I_{11}) \quad (6)$$

As described above, the display position converter 213 converts the position information of the header information of each of plural image data into the display position information that indicates the positional relationship relative to the position information of other images on the coordinate system on the display screen of the display unit 10, by using the equations (5) and (6). FIG. 19 illustrates the case in which the position information is east longitude and north latitude. However, even if the position information is west longitude and south latitude, the display position converter 213 can convert the position information of the header information of the image data into the display position information indicating the positional relationship relative to the position information of other image data by calculating the ratio in the same manner.

Figure 21:
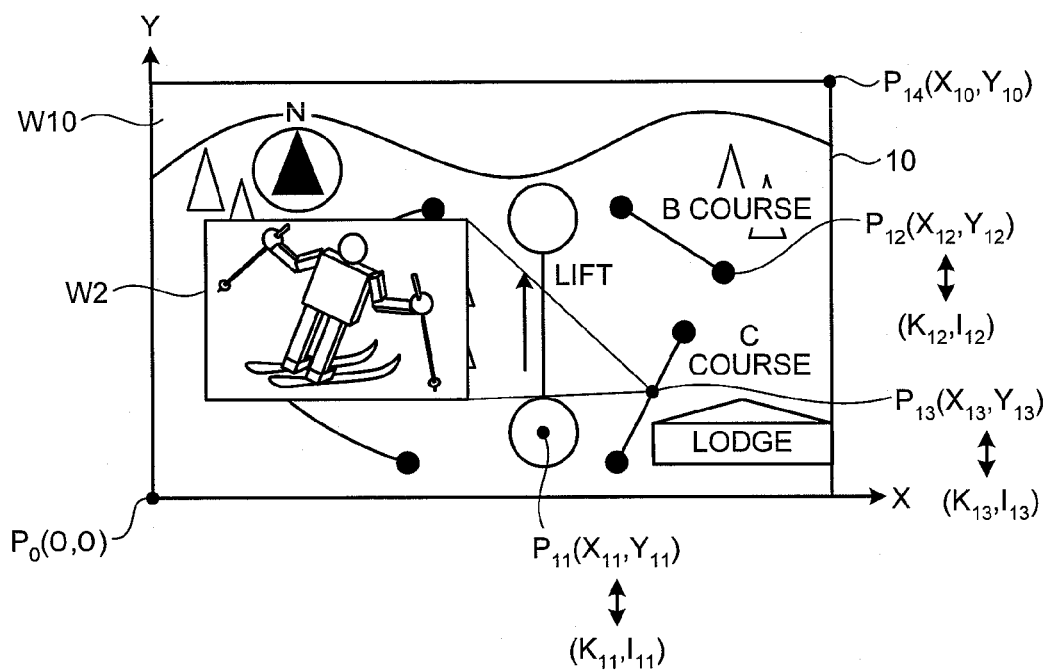
FIG. 21 is a view illustrating one example of an image displayed on the display unit of the imaging apparatus according to the second embodiment of the present invention.

Next, the display controller 214 causes the display unit 10 to display each of the images as reduced image based upon the display position information converted by the display position converter 213 (step S403). For example, as illustrated in FIG. 21, the display controller 214 causes the display unit 10 to display the image W2 with reduced size on the display position on the display screen of the display unit 10 corresponding to the display position information, which is converted by the display position converter 213. Then, the imaging apparatus 200 returns to the main routine illustrated in FIG. 12.

The case where the user does not touch the map image displayed onto the display unit 10 twice or more in step S401 (step S401: No) will be described. In this case, the display controller 214 causes the display unit 10 to display information, indicating that the touch point is insufficient, as an alarm (step S404), and then, the imaging apparatus 200 returns to the main routine illustrated in FIG. 12.

According to the second embodiment of the present invention described above, the association unit 211 associates, as the position information, the apparatus position information, acquired by the position acquiring unit 9, with the map image W10 that is displayed on the display unit 10, according to the instruction signal inputted from the touch panel 11. The display position converter 213 converts the position information of the header information of each of plural image data into the display position information based upon the position information associated with the map image W10 by the association unit 211. The display controller 214 causes the display unit 10 to display each of plural images on the map image W10 based upon the display position information of each image converted by the display position converter 213. Thus, an image on which the shooting position where the image is captured is reflected can be displayed onto an image desired by a user, without a need of an image (template) having position information in advance or a need of a map image.

In the above-mentioned second embodiment, the association unit 211 associates, as the position information, the apparatus position information acquired by the position acquiring unit 9 with the map image W10 displayed onto the display unit 10 according to the instruction signal inputted from the touch panel 11. However, the association unit 211 may associate, as the position information, the apparatus position information acquired by the position acquiring unit 9 with the map image W10 displayed onto the display unit 10 through the operation on the operation switch 84 or the menu switch 85, for example.

In the above-mentioned second embodiment, the display controller 214 synthesizes plural images onto the map image W10 displayed onto the display unit 10, and causes the display unit 10 to display the resultant image. However, the map image is not necessarily used. For example, a graphic manually written is captured, and the display controller may synthesize plural images onto the image corresponding to the captured image data, and causes the display unit 10 to display the resultant image. An image intended by a user may be made or captured. Accordingly, an original map, and original image can be displayed without requiring a troublesome editing operation.

In the above-mentioned second embodiment, the display controller 214 may form plural images superimposed onto a landscape image or human image, and causes the display unit 10 to display the resultant image. With this process, an original map can easily be displayed by utilizing the map or the image captured by the user. Accordingly, the memories during capturing the image can promptly and vividly be reproduced.

Third Embodiment

A third embodiment of the present invention will next be described. An imaging apparatus according to the third embodiment of the present invention has the configuration the same as that of the imaging apparatus according to the second embodiment, and the configuration of the control unit, and the touch-position association process and the map image synthesis display process of the imaging apparatus are different. Therefore, in the description below, the configuration different from the above-mentioned second embodiment will firstly be described, and then, the touch-position association process and the map image synthesis display process according to the third embodiment of the present invention will be described.

Figure 22:
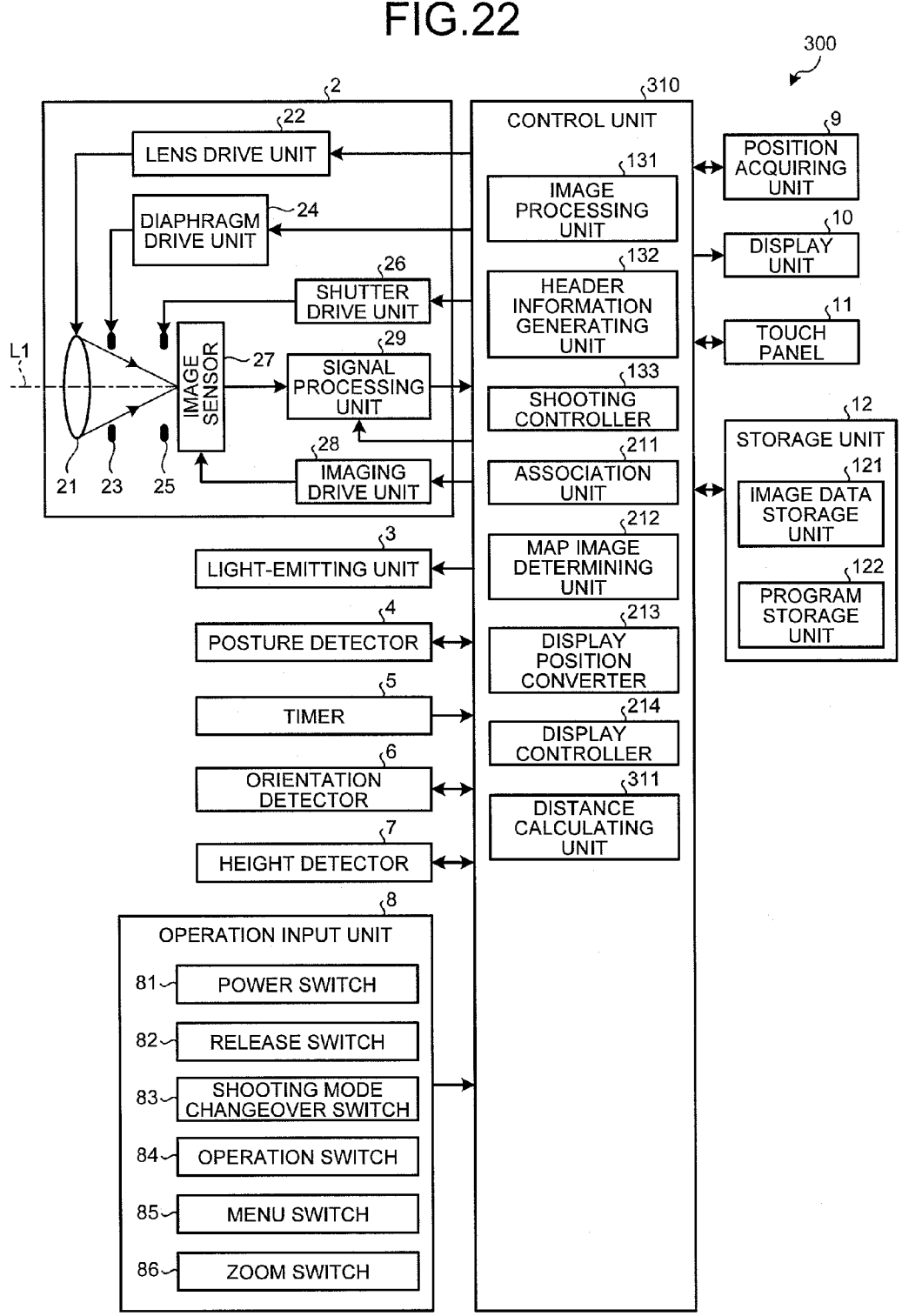
FIG. 22 is a block diagram illustrating a structure of an imaging apparatus according to a third embodiment of the present invention.

FIG. 22 is a block diagram illustrating a structure of an imaging apparatus 300 according to the third embodiment of the present invention. As illustrated in FIG. 22, the imaging apparatus 300 includes a control unit 310.

The control unit 310 includes an image processing unit 131, a header information generating unit 132, a shooting controller 133, an association unit 211, a map image determining unit 212, a display position converter 213, a display controller 214, and a distance calculating unit 311.

The distance calculating unit 311 calculates the distance between different positions based upon the apparatus position information, which is acquired by the position acquiring unit 9 at different times, and which is associated with different positions on the image displayed onto the display unit 10 by the association unit 211.

Figure 23:
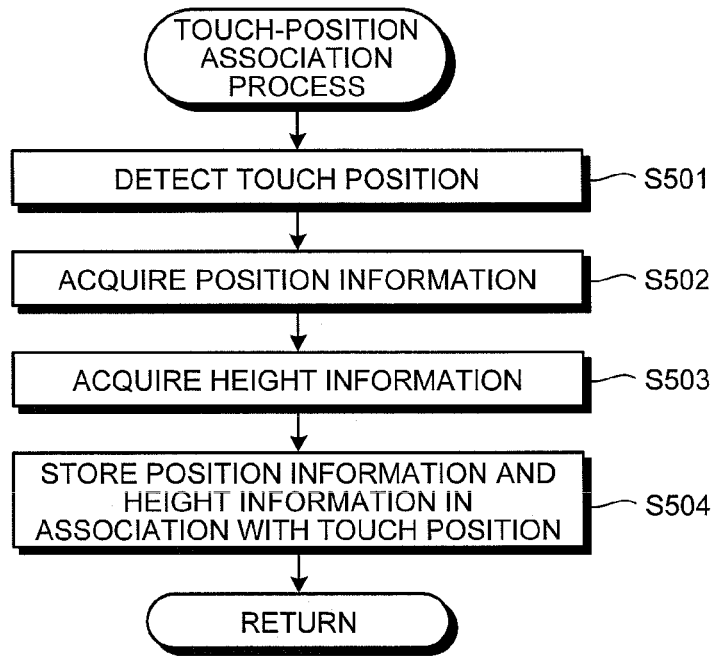
FIG. 23 is a flowchart illustrating the outline of the touch-position association process illustrated in FIG. 12.

The touch-position association process executed by the imaging apparatus 300 according to the third embodiment of the present invention will next be described. FIG. 23 is a flowchart illustrating the outline of the touch-position association process illustrated in FIG. 12.

As illustrated in FIG. 23, the association unit 211 detects the touch position including the region where the user touches on the map image displayed on the display unit 10 according to the instruction signal inputted from the touch panel 11 (step S501).

Next, the position acquiring unit 9 acquires the apparatus position of the imaging apparatus 300 (step S502), and the height detector 7 detects height information of the imaging apparatus 300 (step S503).

Thereafter, the association unit 211 associates the apparatus position information acquired by the position acquiring unit 9 and the height information detected by the height detector 7 with the detected touch position, and causes the resultant to store in the image data storage unit 121 (step S504), and then, the imaging apparatus 300 returns to the main routine illustrated in FIG. 12.

Figure 24:
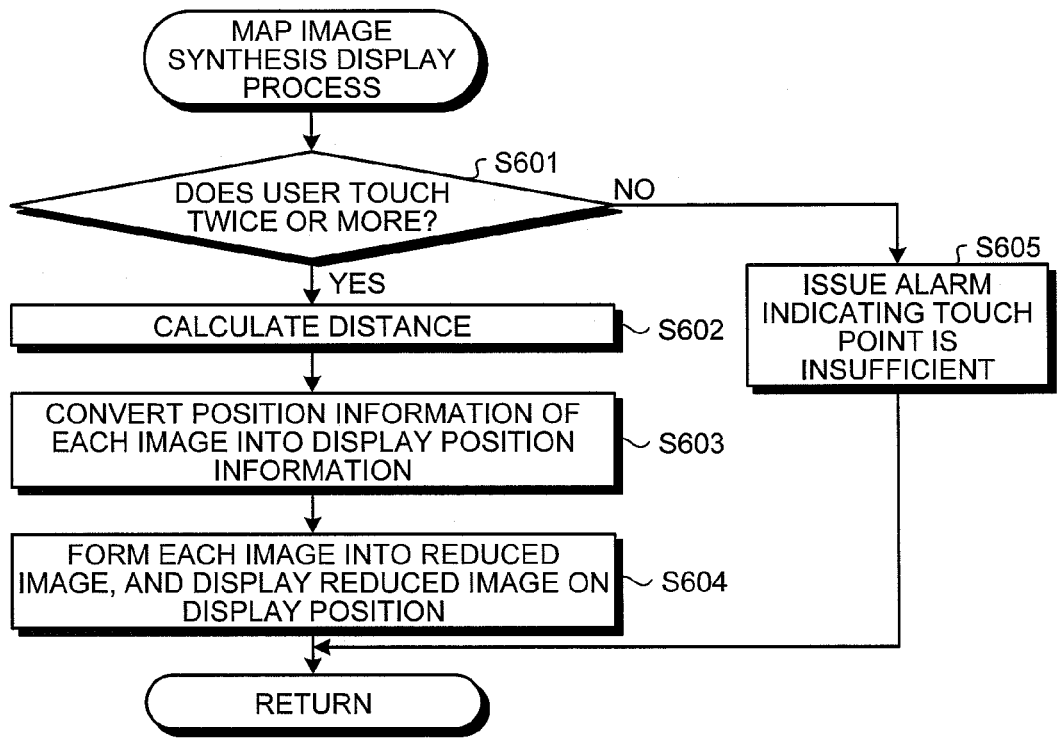
FIG. 24 is a flowchart illustrating the outline of the map image synthesis display process illustrated in FIG. 12.

The map image synthesis display process executed by the imaging apparatus according to the third embodiment of the present invention will next be described. FIG. 24 is a flowchart illustrating the outline of the map image synthesis display process illustrated in FIG. 12.

As illustrated in FIG. 24, the control unit 310 determines whether or not the user touches twice or more the map image displayed onto the display unit 10 at different positions (step S601). When the user touches twice or more at different positions (step S601: Yes), the imaging apparatus 300 proceeds to later-described step S602. On the other hand, when the user does not touch twice or more at different positions (step S601: No), the imaging apparatus 300 proceeds to later-described step S605.

In step S602, the distance calculating unit 311 calculates the distance between different positions and between the images based upon the apparatus position information, which is acquired by the position acquiring unit 9 at different times, and which is associated with different positions on the map image by the association unit 211.

Figure 25:
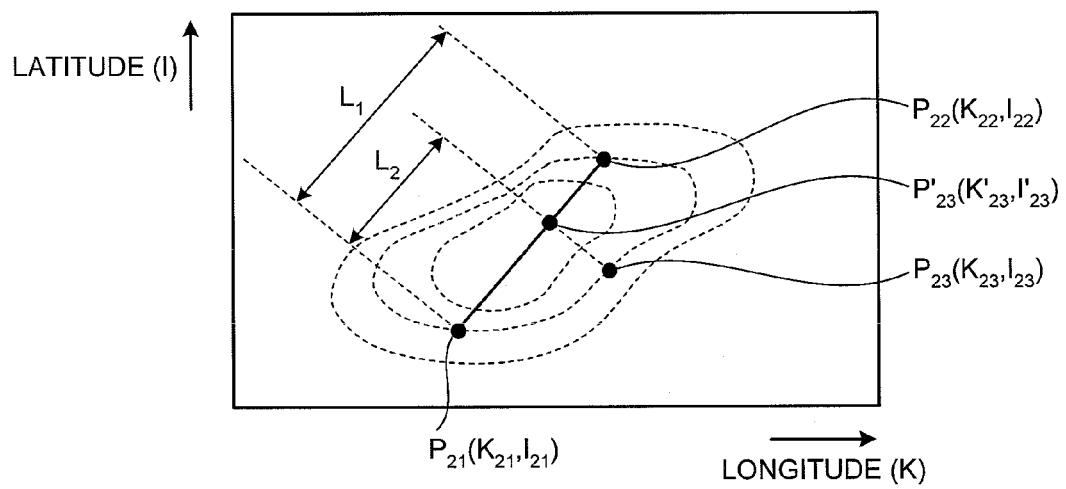
FIG. 25 is a view describing an outline of a calculation method by a distance calculation unit of the imaging apparatus according to the third embodiment of the present invention.

FIG. 25 is a view describing an outline of the calculation method by the distance calculating unit 311. FIG. 25 illustrates the condition where the touch position touched by the user is virtually viewed from top.

As illustrated in FIG. 25, when the longitude of the touch position $P_{21}$ is $K_{21}$, the latitude thereof is $I_{21}$, the longitude of the touch position $P_{22}$ is $K_{22}$, the latitude thereof is $I_{22}$, the longitude of the position $P_{23}$ of the image to be synthesized is $K_{23}$, and the latitude thereof is 23, and when the approximation is made such that the position $P_{23}$ of the image to be synthesized is located on the touch position $P_{21}$, and the touch position $P_{22}$ is located on a straight line (point $P'_{23}(K'_{23}, I'_{23})$), the distance calculating unit 311 calculates distances $L_1$ and $L_2$ according to the approximation equations below.

$$L_1 = \sqrt{(K_{22}-K_{21})^2 + (I_{22}-I_{21})^2} \quad (7)$$

$$L_2 = \sqrt{(K'_{23}-K_{21})^2 + (I'_{23}-I_{21})^2} \quad (8)$$

After step S602, the display position converter 213 converts the position information of the header information, associated with the respective images into display position information that indicates the relative positional relationship of each image on the display screen of the display unit 10, based upon the distance calculated by the distance calculating unit 311 and the height information detected by the height detector 7 (step S603).

Figure 26:
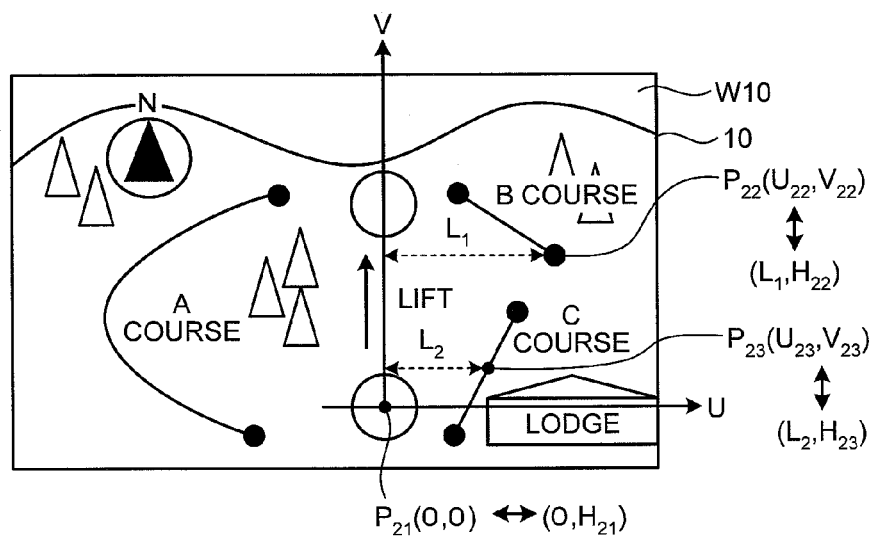
FIG. 26 is a view describing an outline of a conversion method by a display position converter of the imaging apparatus according to the third embodiment of the present invention.

FIG. 26 is a view describing an outline of the conversion method by the display position converter 213. In FIG. 26, a coordinate system is considered, having the point $P_{21}$ defined as an origin (0, 0), and coordinate axes parallel to the longitudinal direction and lateral direction of the image W10. In FIG. 26, the abscissa axis indicates the distance (U) from the origin, while the ordinate axis indicates the height (V) from the origin.

As illustrated in FIG. 26, when the height of the touch position $P_{21}$ (0, 0) is $H_{21}$, the height of the touch position $P_{22}$ ($U_{22}$, $V_{22}$) is $H_{22}$, the height of the image W2 to be synthesized is $H_{23}$, and the display position of the map image W10 is $P_{23}$ ($U_{23}$, $V_{23}$), as the map image W10 is viewed in the coordinate system having the point $P_{21}$ as the origin, the display position converter 213 converts the position information of the image W2 into the display position information indicating the relative relationship of the display position on the map image W10 according to the approximation equations below.

$$(U_{23}-0):(U_{22}-0)=(L_1:L_2) \quad (9)$$

Accordingly, $$X_{23}=L_1 \times X_{22}/L_2 \quad (10)$$

Similarly, $$(V_{23}-0):(V_{22}-0)=(H_{23}-H_{21}):(H_{22}-H_{21}) \quad (11)$$

Accordingly, $$Y_{23}=(H_{23}-H_{21}) \times V_{22}/(H_{22}-H_{21}) \quad (12)$$

As described above, the display position converter 213 converts the position information of the header information and the height information of plural images into the display position information on the coordinate system of the map image W10 displayed onto the display unit 10 with the point $P_{21}$ defined as the origin, by using the equations (10) and (12).

Next, the display controller 214 causes the display unit 10 to display each of the images as reduced images on the display position (e.g., see FIG. 21) of the map image W10 displayed onto the display unit 10 based upon the display position information converted by the display position converter 213 (step S604). Then, the imaging apparatus 300 returns to the main routine illustrated in FIG. 12.

The case where the user does not touch the map image displayed onto the display unit 10 twice or more in step S601 (step S601: No) will be described. In this case, the display controller 214 causes the display unit 10 to display information, indicating that the touch point is insufficient, as an alarm (step S605), and then, the imaging apparatus 300 returns to the main routine illustrated in FIG. 12.

According to the third embodiment of the present invention described above, the display position converter 213 converts the position information of the header information and the height information of each of plural images into the display position information indicating the relative relationship of the display position of each image on the map image W10 displayed onto the display unit 10, based upon the distance calculated by the distance calculating unit 311 and the height information detected by the height detector 7. The display controller 214 causes the display unit 10 to display each of the plural reduced images on the map image W10 displayed onto the display unit 10 based upon the display position information converted by the display position converter 213. Thus, an image on which the shooting position where the image is captured is reflected can be displayed onto an image desired by a user, without a need of an image having position information beforehand.

According to the third embodiment of the present invention, even if the upward direction from the center of the map image displayed onto the display unit 10 is not north, an image can be displayed onto the image by using the position information acquired by the position acquiring unit 9.

Since the ordinate axis of the map image is defined as the height in the third embodiment of the present invention, the map image displayed onto the display unit 10 can virtually be viewed as a 3D image. The left and right of the screen use the position information of GPS. However, when an image is not arranged laterally (an image is arranged only vertically), the image can be displayed with only the height information. With this structure, the apparatus can be more simplified, can be operated with high speed, can be produced with low cost, and can attain space-saving, as described above.

According to the third embodiment of the present invention, the height can relatively easily be measured with low cost by an atmospheric pressure sensor of the height detector 7. Therefore, the apparatus can be more simplified, than a system that is supposed to apply only GPS system. The GPS has a more complicated system, including antenna and signal processing circuit. These components are unnecessary, whereby the system can be simplified, can be produced with low cost, and can attain space-saving. It takes time to capture a satellite signal in the GPS. However, this time can be shortened during the detection of height.

Fourth Embodiment

A fourth embodiment of the present invention will next be described. An imaging apparatus according to the fourth embodiment of the present invention has the configuration same as that of the imaging apparatus according to the second embodiment, and the configuration of the control unit, and the map image synthesis display process of the imaging apparatus are different. Therefore, in the description below, the configuration different from the above-mentioned second embodiment will firstly be described, and then, the map image synthesis display process according to the fourth embodiment of the present invention will be described.

Figure 27:
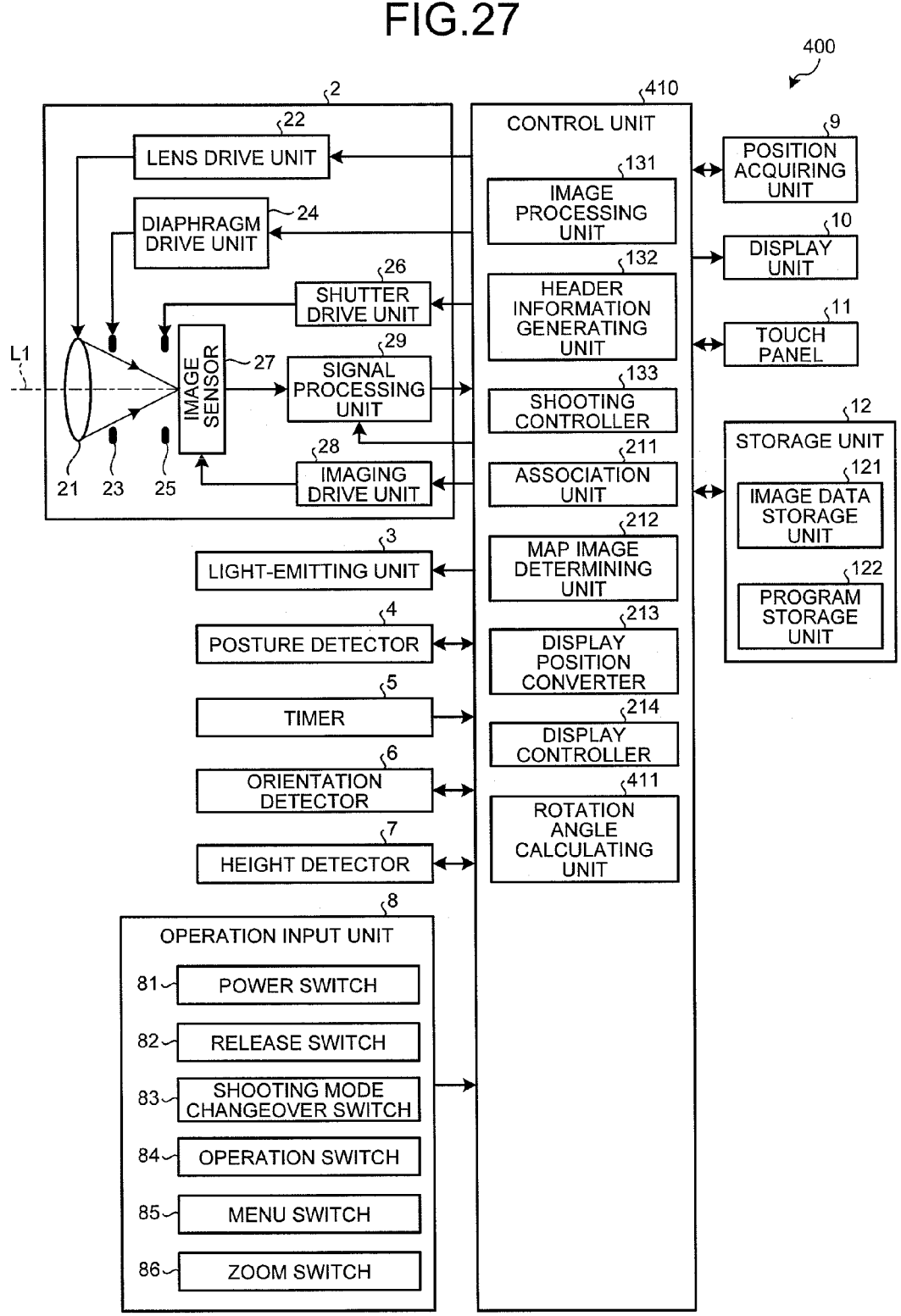
FIG. 27 is a block diagram illustrating a structure of an imaging apparatus according to a fourth embodiment of the present invention.

FIG. 27 is a block diagram illustrating a structure of an imaging apparatus 400 according to the fourth embodiment of the present invention. As illustrated in FIG. 27, the imaging apparatus 400 includes a control unit 410.

The control unit 410 includes an image processing unit 131, a header information generating unit 132, a shooting controller 133, an association unit 211, a map image determining unit 212, a display position converter 213, a display controller 214, and a rotation angle calculating unit 411.

The rotation angle calculating unit 411 calculates a rotation angle needed to allow the reference orientation of the displayed image displayed onto the display unit 10 to agree with a reference of the display unit 10, which is defined as the upward direction from the center of the display screen of the display unit 10, based upon the direction determined by the map image determining unit 212.

Figure 28:
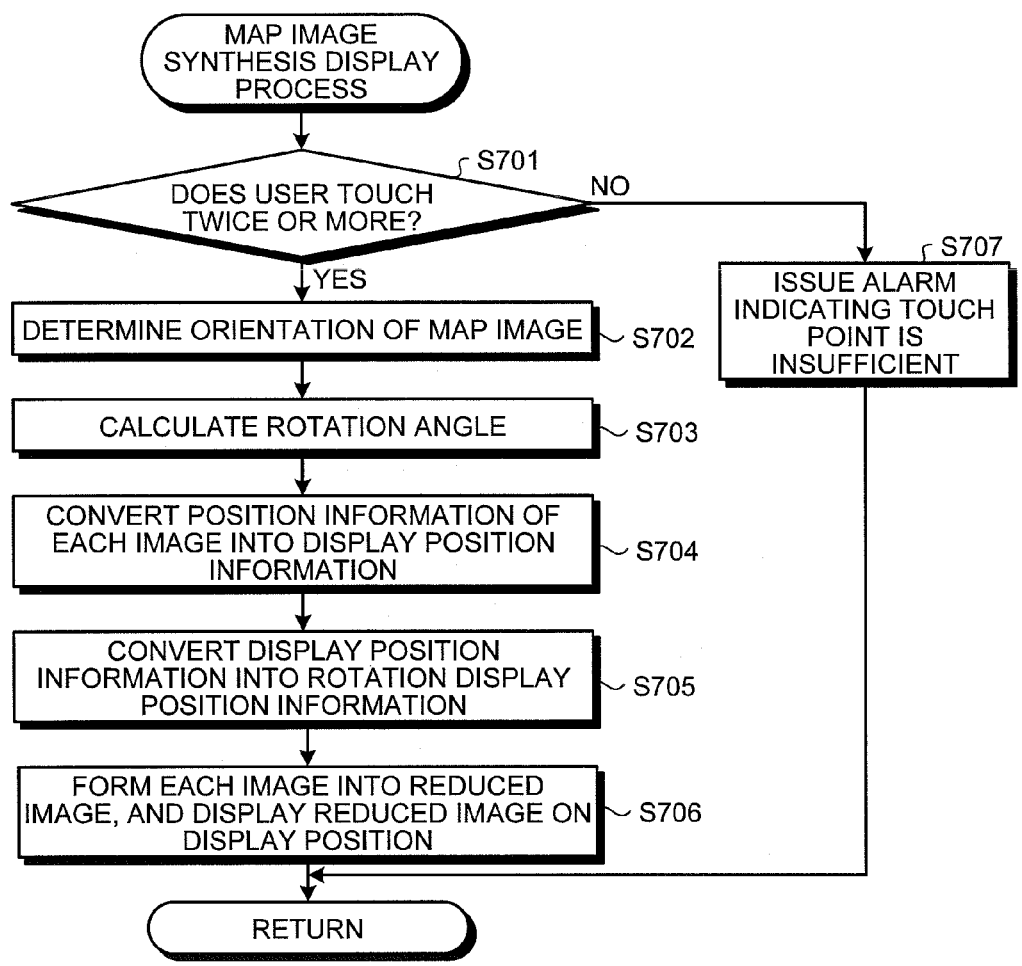
FIG. 28 is a flowchart illustrating the outline of the map image synthesis display process illustrated in FIG. 12.

The map image synthesis display process executed by the imaging apparatus 400 thus configured will be described. FIG. 28 is a flowchart illustrating the outline of the map image synthesis display process (step S216) illustrated in FIG. 12.

As illustrated in FIG. 28, the control unit 410 determines whether or not the user touches twice or more the map image displayed onto the display unit 10 at different positions (step S701). When the user touches twice or more at different positions (step S701: Yes), the imaging apparatus 400 proceeds to later-described step S702. On the other hand, when the user does not touch twice or more at different positions (step S701: No), the imaging apparatus 400 proceeds to later-described step S707.

In step S702, the map image determining unit 212 determines the direction of the reference orientation of the map image displayed onto the display unit 10 (step S702). Specifically, the map image determining unit 212 determines the direction pointed by the reference orientation, e.g., pointed by north, of the map image, by referring to the header information of the map image displayed onto the display unit 10.

When the upward direction from the center of the display screen of the display unit 10 is defined as the reference of the display unit 10, the rotation angle calculating unit 411 then calculates the rotation angle needed to allow the reference orientation of the map image to agree with the reference based upon the direction determined by the map image determining unit 212 (step S703). Specifically, when the upward direction from the center of the display screen of the display unit 10 is defined as the reference of the display unit 10, the rotation angle calculating unit 411 calculates the rotation angle needed to allow the north, which is the reference orientation of the map image, to agree with the reference in a state in which the imaging apparatus 400 is horizontal.

Then, the display position converter 213 converts the position information of the header information of each of plural image data into the display position information indicating the relative display position of each image on the display screen of the display unit 10 by using the equations (5) and (6) (step S704).

Figure 29:
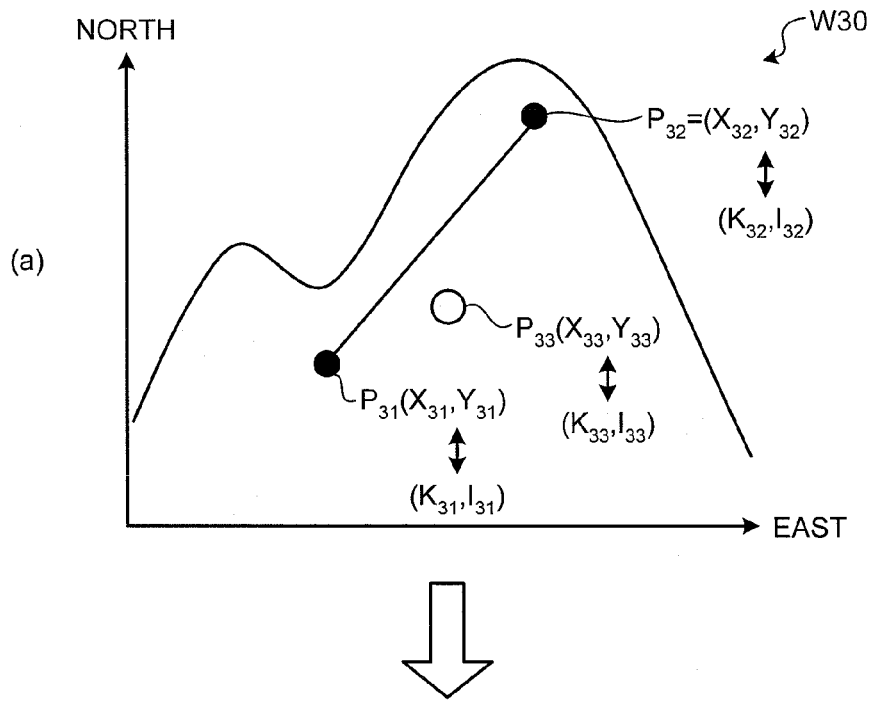
FIG. 29 is a view describing an outline of a conversion method by a display position converter of an imaging apparatus according to the fourth embodiment of the present invention.
Figure 29:
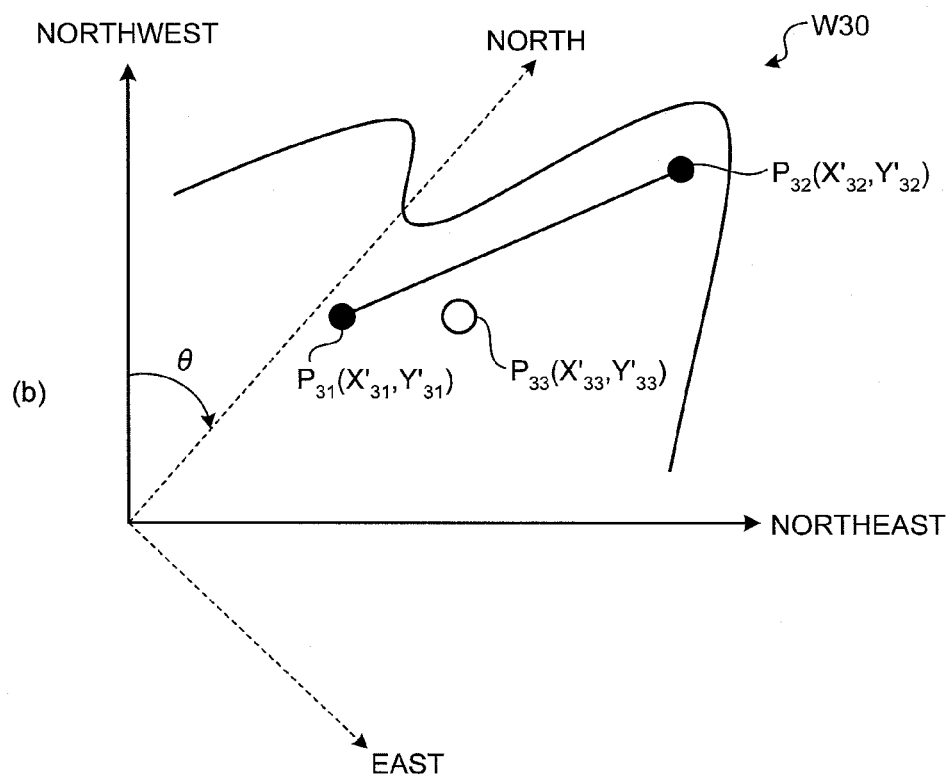

FIG. 29 is a view describing an outline of the conversion process by the display position converter 213. In FIG. 29, the abscissa axis and ordinate axis indicate direction. In FIG. 29, the direction in which the image is rotated in a counterclockwise direction from the state displayed onto the display unit 10 is defined as positive (+), while the direction in which the image is rotated in a clockwise direction is defined as negative (−).

As illustrated in FIG. 29(a), the display position converter 213 converts the position information of the header information of each of plural image data into the display position information that indicates the positional relationship relative to the position information of other images on the display screen of the display unit 10, by using the equations (5) and (6). Specifically, the longitude and latitude of the touch position $P_{31}$ ($X_{31}$, $Y_{31}$) are ($K_{31}$, $I_{31}$), the longitude and latitude of the touch position $P_{32}$ ($X_{32}$, $Y_{32}$) are ($k_{32}$, $I_{32}$), the longitude and latitude of the image W2 (see FIG. 8) to be synthesized are ($K_{33}$, $I_{33}$), and the display position of the image W2 to be synthesized on the display screen of the display unit 10 is $P_{33}$ ($X_{33}$, $Y_{33}$), the display position converter 213 converts the position information of the image W2 into the display position information according to the approximate equations below.

$$X_{33}=X_{31}+(K_{33}-K_{31})\times(X_{32}-X_{31})/(K_{32}-K_{31}) \quad (13)$$

Similarly, $$Y_{33}=Y_{31}+(I_{33}-I_{31})\times(Y_{32}-Y_{31})/(I_{32}-I_{31}) \quad (14)$$

Then, the display position converter 213 converts the display position information of each of plural image data into rotation display position information, which indicates the display position of each image when the reference orientation of the map image is virtually matched to the reference of the display unit 10, based upon the rotation angle calculated by the rotation angle calculating unit 411 (step S705).

As illustrated in FIG. 29(b), when the upward direction from the center of the map image W30 displayed onto the display screen of the display unit 10 is "northwest", the display position converter 213 converts the display positions $P_{31}$ ($X_{31}$, $Y_{31}$) and $P_{32}$ ($X_{32}$, $Y_{32}$), corresponding to the respective touch positions, and the display position $P_{33}$ ($X_{33}$, $Y_{33}$) corresponding to the image W2 into the rotation display position (X', Y'), according to the equations below, in such a manner that the upward direction from the center of the map image W30 displayed onto the display unit 10 becomes "north" (in FIG. 29(b)).

$$X'=X\cos\theta-Y\sin\theta \quad (15)$$

$$Y'=X\sin\theta+Y\cos\theta \quad (16)$$

As described above, even if the upward direction from the center of the map image W30 displayed onto the display unit 10 is not north, the display position converter 213 virtually rotates, for example, the map image W30 in the counterclockwise direction (e.g., θ=45 degrees), thereby being capable of converting the display position information, associated with the respective touch positions and images, into the rotation display position information when the upward direction from the center of the map image W30 displayed onto the display unit 10 is defined as north.

Next, the display controller 214 causes the display unit 10 to display each of the images as reduced images on the display position (e.g., see FIG. 21) on the display screen of the display unit 10 based upon the rotation display position information converted by the display position converter 213 (step S706). Then, the imaging apparatus 400 returns to the main routine illustrated in FIG. 12.

The case where the user does not touch the map image displayed onto the display unit 10 twice or more in step S701 (step S701: No) will be described. In this case, the display controller 214 causes the display unit 10 to display information, indicating that the touch point is insufficient, as an alarm (step S707), and then, the imaging apparatus 400 returns to the main routine illustrated in FIG. 12.

According to the fourth embodiment of the present invention described above, the rotation angle calculating unit 411 calculates the rotation angle of the display image to the reference orientation based upon the orientation of the displayed image when the upward direction from the center of the display screen of the display unit 10 is defined as the reference orientation, the orientation of the displayed image being determined by the map image determining unit 212. The display position converter 213 converts the position information associated with the touch position and the position information of the header information associated with each image into the rotation position information based upon the rotation angle calculated by the rotation angle calculating unit 411. The display position converter 213 also converts the rotation position information into the display position information. The display controller 214 causes the display unit 10 to display each of the plural reduced images on the map image displayed onto the display unit 10 based upon the display position information converted by the display position converter 213. Thus, an image on which the shooting position where the image is captured is reflected can be displayed onto an image desired by a user, without a need of an image having position information beforehand.

According to the fourth embodiment of the present invention, even if the upward direction from the center of the map image displayed onto the display unit 10 is not north, an image can be displayed onto the image by using the position information acquired by the position acquiring unit 9.

In the fourth embodiment described above, the display position converter 213 converts the position information of the header information of each image data into the display position information, and then, converts the display position information into the rotation display position information. However, the display position converter 213 may convert the position information of the header information of the image data into the rotation display position information, and then, convert the rotation display position information into the display position information.

Other Embodiments

In the embodiments described above, the display position converter converts the position information associated with the respective images into the display position information that reflects the positional relationship relative to the position information of the other images on the display screen of the display unit, and the display controller causes the display unit to display plural images based upon the display position information of each image converted by the display position converter. Alternatively, plural images can be displayed onto the display unit based upon the difference between the longitude and latitude included in the position information of each image. Specifically, the display position converter may convert the position information into the display position information that reflects the display position on the display screen of the display unit based upon the difference between the longitude and latitude included into the position information associated with each image, and the display controller may determine and display the display position of plural images when they are displayed onto the display unit, based upon the display position information of each image converted by the display position converter. Thus, the user can promptly, easily, and intuitively grasp the positional shooting relationship of each image, which reflects the longitude and latitude of the shooting places of the captured images, when the respective images are displayed onto the display unit 10 all together.

In the above-mentioned embodiments, the association unit associates, as the position information, the apparatus position information acquired by the position acquiring unit with the map image displayed onto the display unit according to the instruction signal inputted from the touch panel, the display position converter converts the position information of the header information of each of plural image data into the display position information based upon the position information associated with the map image by the association unit, and the display controller displays each of plural images on the map image based upon the display position information of each image converted by the display position converter. Alternatively, the apparatus position information acquired by the position acquiring unit may be associated as the position information on the display screen of the display unit. Specifically, when the touch panel accepts the input of the instruction signal at different positions on the display screen of the display unit, the association unit associates the apparatus position information acquired by the position acquiring unit with the touched position on the display screen of the display unit, and the display controller displays the plural images onto the display unit based upon the apparatus position information associated with the position on the display screen of the display unit by the association unit and the position information associated with each image. Thus, an image on which the shooting position where the image is captured is reflected can be displayed onto an image desired by a user, without a need of an image (template) having position information beforehand or a need of a map image. When the imaging apparatus is set to the map setting mode, the display controller may display information, such as a display, graphic, or icon, for urging a user to touch an image displayed onto the display unit, in a superimposition manner. The display controller may allow, for example, speakers to output a vocal guidance for urging a user to touch.

In the above-mentioned embodiments, the display controller displays the selected images as reduced images based upon the display position information converted by the display position converter. Alternatively, an index may be displayed, instead of the selected images. With this configuration, the display region of the image currently displayed onto the display unit can be increased. The display controller may display a character, symbol, or color, instead of the selected images.

In the above-mentioned embodiments, the display controller causes the display unit 10 to display the selected images as reduced images. Alternatively, a range of date or position information may be formed with respect to the display position information converted by the display position converter, for example, and only the images falling within this range may be reduced and displayed.

In the above-mentioned embodiments, the imaging apparatus is employed as the display apparatus such as a digital camera. However, the present invention is applicable to various electric devices provided with a display function, such as a digital single-lens reflex camera, a digital video camera, a cellular phone, a tablet mobile device, and an electric photo frame.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display apparatus comprising:
a display that displays a map image, wherein the map image does not have existing geolocation position information corresponding to points on the map image;
an input unit that receives, at two different times and when the display apparatus is at two different geolocation positions, at least two user touch inputs at different display positions on the map image displayed by the display;

a position acquiring unit that acquires apparatus geolocation position information of the display apparatus responsive to each of the at least two user touch operations received; and means for converting, responsive to the receipt of each of the at least two user touch inputs by the input unit on the map image displayed, geolocation position information associated with each of a plurality of images into display position information corresponding to positions on the map image.

2. The display apparatus according to claim 1, further comprising:

an imaging unit that captures a region of a predetermined field of view so as to generate image data; and an image data storage unit that associates the apparatus geolocation position information acquired by the position acquiring unit with the image data as the geolocation position information and stores the resultant associated apparatus geolocation position information with the image data, when the imaging unit generates image data.

3. The display apparatus according to claim 2, further comprising a display controller that causes the display to display the plurality of images based upon the display position information of each image converted by the means for converting, wherein the display controller causes the display to display a reduced image, which is formed by reducing each of the plurality of images with a predetermined reduction ratio.

4. The display apparatus according to claim 3, wherein the display controller causes the display to display an index corresponding to the display position of each of the plurality of images.

5. The display apparatus according to claim 1, wherein the input unit is a touch panel that is provided on the display screen of the display, and that accepts an input of a signal according to an external touch position thereon, and the means for converting associates the apparatus geolocation position information, when the touch panel accepts the input of the instruction signal on different positions on the display screen.

6. The display apparatus according to claim 5, further comprising:

a height detector that detects a height of the display apparatus; and a distance calculating unit that calculates a distance between different positions based upon two apparatus geolocation position information that were associated with the different display positions by the means for converting, wherein the means for converting converts the geolocation position information associated with each of the plurality of images into the display position information based upon the height and the distance.

7. The display apparatus according to claim 6, further comprising:

a map image determining unit that determines a direction pointed by a reference orientation of the displayed map image; and a rotation angle calculating unit that calculates a rotation angle needed to allow the reference orientation to agree with a reference, when an upward direction from the center of the display screen of the display is defined as the reference, based upon the direction determined by the map image determining unit, wherein the means for converting converts the display position information into rotation display position information that indicates the display position of each image when the reference orientation of the displayed image is virtually agreed with the reference, based upon the rotation angle.

8. The display apparatus according to claim 7, further comprising:

an imaging unit that captures a region of a predetermined field of view so as to generate image data; and an image data storage unit that associates the apparatus geolocation position information acquired by the position acquiring unit with the image data as the geolocation position information and stores the resultant associated apparatus geolocation position information with the image data, when the imaging unit generates image data.

9. The display apparatus according to claim 8 further comprising a display controller that causes the display to display the plurality of images based upon the display position information of each image converted by the means for converting, wherein the display controller causes the display unit to display information indicating an alarm, when the geolocation position information associated with the image to be displayed onto the display by the means for converting is insufficient in case where the means for converting converts the geolocation position information associated with each of the plurality of images into the display position information.

10. The display apparatus according to claim 9, wherein the display controller causes the display to display a reduced image, which is formed by reducing each of the plurality of images with a predetermined reduction ratio.

11. The display apparatus according to claim 10, wherein the display controller causes the display to display an index corresponding to the display position of each of the plurality of images.

12. A display method executed by a display apparatus provided with a display that displays a map image, wherein the map image does not have existing geolocation position information corresponding to points on the map image, the method comprising:

receiving, at two different times and when the display apparatus is at two different geolocation positions, at least two user touch inputs at different display positions on the map image displayed by the display;

acquiring apparatus geolocation position information of the display apparatus responsive to each of the at least two user touch operations;

associating, responsive to the receipt of each of the at least two user touch inputs on the map image displayed, (1) the apparatus geolocation position information acquired at the time of receipt of the respective user touch input, with (2) display position information of the respective user touch input; and converting geolocation position information associated with each of a plurality of images into display position information based upon the different apparatus geolocation position information that have been associated with the different user touch positions on the map image.

13. The display method according to claim 12, further comprising:

capturing a region of a predetermined field of view so as to generate image data; and associating the apparatus geolocation position information acquired with the image data as the geolocation position information and storing the resultant associated apparatus geolocation position information with the image data, when generating image data.

14. The display method according to claim 12, further comprising causing the display to display an index corresponding to the display position of each of the plurality of images.

15. The display method according to claim 12, further comprising:
    detecting a height of the display apparatus;
    calculating a distance between different positions based upon two apparatus geolocation position information that were associated with the different display positions; and
    converting the geolocation position information associated with each of the plurality of images into the display position information based upon the height and the distance.

16. A non-transitory computer-readable recording medium with an executable program stored thereon, wherein the program instructs a processor, which is provided to a display apparatus including a display that displays a map image, wherein the map image does not have existing geolocation position information corresponding to points on the map image, to perform a method comprising:
    receiving, at two different times and when the display apparatus is at two different geolocation positions, at least two user touch inputs at different display positions on the map image displayed by the display;
    acquiring apparatus geolocation position information of the display apparatus responsive to each of the at least two user touch operations;
    associating, responsive to the receipt of each of the at least two user touch inputs on the map image displayed, (1) the apparatus geolocation position information acquired at the time of receipt of the respective user touch input, with (2) display position information of the respective user touch input; and
    converting geolocation position information associated with each of a plurality of images into display position information based upon the different apparatus geolocation position information that have been associated with the different user touch positions on the map image.

17. The non-transitory computer-readable recording medium according to claim 16, wherein the method stored thereon further includes:
    capturing a region of a predetermined field of view so as to generate image data; and
    associating the apparatus geolocation position information acquired with the image data as the geolocation position information and storing the resultant associated apparatus geolocation position information with the image data, when generating image data.

18. The non-transitory computer-readable recording medium according to claim 16, wherein the method stored thereon further includes causing the display to display an index corresponding to the display position of each of the plurality of images.

19. The non-transitory computer-readable recording medium according to claim 16, wherein the method stored thereon further includes:
    detecting a height of the display apparatus;
    calculating a distance between different positions based upon two apparatus geolocation position information that were associated with the different display positions; and
    converting the geolocation position information associated with each of the plurality of images into the display position information based upon the height and the distance.

* * * * *